United States Patent
Kalebjian et al.

(10) Patent No.: US 10,119,444 B2
(45) Date of Patent: Nov. 6, 2018

(54) EXHAUST MANAGEMENT STRATEGIES FOR OPPOSED-PISTON, TWO-STROKE ENGINES

(71) Applicant: Achates Power, Inc., San Diego, CA (US)

(72) Inventors: Christopher J. Kalebjian, Columbus, MI (US); Suramya D. Naik, San Diego, CA (US); Fabien G. Redon, San Diego, CA (US)

(73) Assignee: ACHATES POWER, INC., San Diego, CA (US)

( * ) Notice: Subject to any disclaimer, the term of this patent is extended or adjusted under 35 U.S.C. 154(b) by 1076 days.

(21) Appl. No.: 14/378,252

(22) PCT Filed: Feb. 19, 2013

(86) PCT No.: PCT/US2013/026737
§ 371 (c)(1),
(2) Date: Aug. 12, 2014

(87) PCT Pub. No.: WO2013/126347
PCT Pub. Date: Aug. 29, 2013

(65) Prior Publication Data
US 2015/0033736 A1    Feb. 5, 2015

Related U.S. Application Data

(60) Provisional application No. 61/634,168, filed on Feb. 21, 2012.

(51) Int. Cl.
*F01N 3/20*    (2006.01)
*F02D 41/06*    (2006.01)
(Continued)

(52) U.S. Cl.
CPC .............. *F01N 3/2006* (2013.01); *F01B 7/02* (2013.01); *F01B 7/14* (2013.01); *F02B 25/08* (2013.01);
(Continued)

(58) Field of Classification Search
CPC .. F01B 7/02; F01B 7/14; F01N 3/2006; F02B 2075/025; F02B 25/08; F02B 29/0412;
(Continued)

(56) References Cited

U.S. PATENT DOCUMENTS

| 4,938,180 A | 7/1990 | King |
| 5,367,996 A | 11/1994 | Homil et al. |

(Continued)

FOREIGN PATENT DOCUMENTS

| CN | 101970845 A | 2/2011 |
| EP | 2077382 A1 | 8/2009 |

(Continued)

OTHER PUBLICATIONS

English Translation of Text of the First Office Action, dated Mar. 11, 2016, issued by the State Intellectual Property of China, for Chinese Patent Application No. 2013800190457.

(Continued)

*Primary Examiner* — Mark Laurenzi
*Assistant Examiner* — Paul Thiede
(74) *Attorney, Agent, or Firm* — Terrance A. Meador

(57) ABSTRACT

Exhaust temperature management strategies for an opposed-piston, two-stroke engine with EGR are based on control of a ratio of the mass of fresh air and external EGR delivered to a cylinder to the mass of the trapped charge (density of the delivered charge multiplied by the trapped volume at port closing).

7 Claims, 21 Drawing Sheets

(51) Int. Cl.
*F02B 37/04* (2006.01)
*F01B 7/02* (2006.01)
*F01B 7/14* (2006.01)
*F02B 29/04* (2006.01)
*F02B 25/08* (2006.01)
*F02B 75/28* (2006.01)
*F02B 33/44* (2006.01)
*F02B 75/02* (2006.01)
*F02M 26/08* (2016.01)
*F02M 26/15* (2016.01)
*F02M 26/23* (2016.01)

(52) U.S. Cl.
CPC .......... *F02B 29/0412* (2013.01); *F02B 33/44* (2013.01); *F02B 37/04* (2013.01); *F02B 75/02* (2013.01); *F02B 75/282* (2013.01); *F02D 41/064* (2013.01); *F02M 26/08* (2016.02); *F02B 29/0418* (2013.01); *F02B 2075/025* (2013.01); *F02M 26/15* (2016.02); *F02M 26/23* (2016.02); *Y02T 10/144* (2013.01); *Y02T 10/146* (2013.01)

(58) Field of Classification Search
CPC ...... F02B 29/0418; F02B 33/44; F02B 37/04; F02B 75/02; F02B 75/282; F02D 41/064; F02M 26/08; F02M 26/15; F02M 26/23
USPC ........................................ 60/605.1
See application file for complete search history.

(56) References Cited

U.S. PATENT DOCUMENTS

| | | |
|---|---|---|
| 5,540,193 A | 7/1996 | Achten et al. |
| 6,092,496 A | 7/2000 | Bhargava et al. |
| 7,395,809 B2 | 7/2008 | Moller |
| 8,050,844 B2 | 11/2011 | Hoard et al. |
| 8,265,856 B2 | 9/2012 | Hoard et al. |
| 9,032,927 B1 | 5/2015 | Redon |
| 9,206,752 B2 | 12/2015 | Naik |
| 2008/0066724 A1 | 3/2008 | Klingebiel et al. |
| 2009/0159022 A1 | 6/2009 | Chu |
| 2009/0240419 A1 | 9/2009 | Hoard et al. |
| 2011/0114070 A1 | 5/2011 | Liu et al. .................. 123/590 |
| 2011/0192143 A1 | 8/2011 | Andersson et al. |
| 2011/0289916 A1 | 12/2011 | Dion et al. |
| 2012/0029791 A1 | 2/2012 | Hoard et al. |
| 2012/0125298 A1 | 5/2012 | Lemke et al. |
| 2013/0104848 A1 | 5/2013 | Klyza et al. |
| 2013/0297182 A1 | 11/2013 | Vincenzi et al. |
| 2014/0373814 A1 | 12/2014 | Herold et al. |
| 2015/0128907 A1 | 5/2015 | Redon |
| 2015/0219030 A1 | 8/2015 | Naik |

FOREIGN PATENT DOCUMENTS

| | | |
|---|---|---|
| GB | 510542 A | 8/1939 |
| JP | 2003-003897 | 1/2003 |
| JP | 2003-254051 | 9/2003 |
| JP | 2008-063976 | 3/2008 |
| JP | 2010-180711 | 8/2010 |
| WO | WO 2009/100461 A2 | 8/2009 |
| WO | WO-2011/14611 | 11/2011 |
| WO | WO 2011/146111 A1 | 11/2011 |
| WO | WO 2012/067643 A1 | 5/2012 |

OTHER PUBLICATIONS

Communication pursuant to Article 94(3) EPC dated Jun. 23, 2017, for European patent application 13708301.0.
English Translation of Text of the Office Action, dated Sep. 20, 2016, issued by the Japanese Patent Office, for Japanese Patent Application No. 2014-558782.
English Translation of Text of the Second Office Action, dated Aug. 26, 2016, issued by the State Intellectual Property of China, for Chinese Patent Application No. 2013800190457.
Lambert, C., "Advanced CIDI Emission Control System Development", Report for the U.S. Department of Energy, DE-FC26-01NT41103, Jun. 30, 2006.

EXHAUST MANAGEMENT STRATEGIES FOR OPPOSED-PISTON, TWO-STROKE ENGINES

BACKGROUND

The field is internal combustion engines. Particularly, the field relates to two-stroke internal combustion engines. More specifically, the field covers exhaust management strategies for opposed-piston, two-stroke engines.

As seen in FIG. 1, an opposed-piston engine includes at least one cylinder 10 with a bore 12 and longitudinally-displaced exhaust and intake ports 14 and 16 machined or formed therein. Fuel injector nozzles 17 are located in or adjacent injector ports that open through the side of the cylinder, at or near the longitudinal center of the cylinder. Two pistons 20, 22 are disposed in the bore 12 of the cylinder with their end surfaces 20e, 22e in opposition to each other. For convenience, the piston 20 is referred as the "exhaust" piston because of its proximity to the exhaust port 14; and, the end of the cylinder wherein the exhaust port is formed is referred to as the "exhaust end". Similarly, the piston 22 is referred as the "intake" piston because of its proximity to the intake port 16, and the corresponding end of the cylinder is the "intake end".

Operation of an opposed-piston engine with one or more cylinders such as the cylinder 10 is well understood. In this regard, and with reference to FIG. 2, in response to combustion occurring between the end surfaces 20e, 22e the opposed pistons move away from respective top dead center (TDC) positions where they are at their closest positions relative to one another in the cylinder. While moving from TDC, the pistons keep their associated ports closed until they approach respective bottom dead center (BDC) positions in which they are furthest apart from each other. The pistons may move in phase so that the exhaust and intake ports 14, 16 open and close in unison. Alternatively, one piston may lead the other in phase, in which case the intake and exhaust ports have different opening and closing times.

In many opposed-piston constructions, a phase offset is introduced into the piston movements. As shown in FIG. 1, for example, the exhaust piston leads the intake piston and the phase offset causes the pistons to move around their BDC positions in a sequence in which the exhaust port 14 opens as the exhaust piston 20 moves through BDC while the intake port 16 is still closed so that combustion gasses start to flow out of the exhaust port 14. As the pistons continue moving away from each other, the intake port 16 opens while the exhaust port 14 is still open and a charge of pressurized air ("charge air") is forced into the cylinder 10, driving exhaust gasses out of the exhaust port 14. The displacement of exhaust gas from the cylinder through the exhaust port while admitting charge air through the intake port is referred to as "scavenging". Because the charge air entering the cylinder flows in the same direction as the outflow of exhaust gas (toward the exhaust port), the scavenging process is referred to as "uniflow scavenging".

As the pistons move through their BDC locations and reverse direction, the exhaust port 14 is closed by the exhaust piston 20 and scavenging ceases. The intake port 16 remains open while the intake piston 22 continues to move away from BDC. As the pistons continue moving toward TDC (FIG. 2), the intake port 16 is closed and the charge air in the cylinder is compressed between the end surfaces 20e and 22e. Typically, the charge air is swirled as it passes through the intake port 16 to promote scavenging while the ports are open and, after the ports close, to mix the air with the injected fuel. Fuel (which is, typically, diesel) is injected into the cylinder by one or more high pressure injectors. With reference to FIG. 1 as an example, the swirling air (or simply, "swirl") 30 has a generally helical motion that forms a vortex in the bore that circulates around the longitudinal axis of the cylinder. As best seen in FIG. 2, as the pistons advance toward their respective TDC locations in the cylinder bore, fuel 40 is injected through the nozzles 17 directly into the swirling charge air 30 in the bore 12, between the end surfaces 20e, 22e of the pistons. The swirling mixture of charge air and fuel is compressed in a combustion chamber 32 defined between the end surfaces 20e and 22e when the pistons 20 and 22 are near their respective TDC locations. When the mixture reaches an ignition temperature, the fuel ignites in the combustion chamber, driving the pistons apart toward their respective BDC locations.

Each complete movement of a piston 20, 22 (TDC to BDC and BDC to TDC) is a "stroke". Since one complete power cycle of the engine occurs in two complete movements of a piston, the engine is referred to as a "two-stroke engine" or a "two-stroke cycle engine".

As illustrated in FIG. 2, fuel is directly injected through the side of the cylinder ("direct side injection") into the cylinder bore and the movement of the fuel interacts with the residual swirling motion of the charge air in the bore. As the engine operating level increases and the heat of combustion rises, an increasing amount of nitrogen oxide (NOx) is produced. However, increasingly stringent emission requirements indicate the need for a significant degree of NOx reduction. One technique reduces NOx emission by exhaust gas recirculation ("EGR"). EGR has been incorporated into spark-ignited four-stroke engine constructions and two-stroke, compression-ignition engines with a single piston operating in each cylinder. EGR constructions for opposed-piston, two-stroke engines are taught in the assignee's U.S. patent application Ser. No. 13/068,679, filed May 16, 2011 and published as US 2011/0289916 A1 on Dec. 1, 2011.

However, while opposed-piston two-cycle engines can now be equipped with EGR to reduce NOx emissions, new control strategies are needed to manage tailpipe emissions (exhaust) in response to varying engine operating conditions such as cold start, low load, and low ambient temperature.

In this regard, diesel engines can be equipped with after-treatment systems that subject exhaust gasses to catalytic processes that convert HC, CO and NOx. The catalytic materials must be heated to a "light-off" level in order to function. After-treatment systems may also include a diesel particulate filter (DPF) that filters soot from the exhaust gasses. Thermal energy must be delivered to the filtration material in order for it to achieve a temperature level at which it properly regenerates. In both cases, heat is obtained from the exhaust gasses themselves. However, when the engine is initially turned on from an ambient non-operating thermal state (referred to as a "cold start"), the exhaust gasses are insufficiently hot to activate the catalytic materials and/or to regenerate the DPF. Presently, the majority of tailpipe emissions during certification as well as under real-world driving conditions occur just after starting the engine, before the catalyst and filtration materials reach operating temperatures. In many applications, greater than 50% of the tailpipe emissions on a diesel FTP-75 test occur in the cold start phase (Lambert, C., 2006. "Advanced CIDI Emission Control System Development", Report for the U.S. Department of Energy, DE-FC26-01NT41103, Jun. 30, 2006). In fact, with a well designed after-treatment system, it can be shown that greater than 50% of the tailpipe emissions occur during the first 200 seconds of the test.

Thus, the time from initial engine start-up to when the catalyst and filtration materials have enough heat to perform adequately needs to decrease.

Accordingly, it is desirable to operate an opposed-piston two-cycle engine during cold start by rapidly raising the exhaust gas temperature in order to achieve early activation of after-treatment materials.

Another characteristic of diesel cold start is combustion instability in which successful combustion is punctuated by complete or partial misfires as the engine accelerates to an idling speed. Therefore, in some aspects, it is desirable that a strategy for elevating exhaust temperatures during cold start of an opposed-piston two-stroke engine also provide for combustion stability.

In other words, it is desirable to provide high exhaust temperatures in the exhaust gasses of an EGR-equipped, opposed-piston two-stroke engine under varying operating conditions while maintaining the engine's combustion stability.

SUMMARY

A strategy to achieve these objectives is based upon management of the gas temperature in the cylinder just after port closing (PC) so as to control the exhaust temperature in a way that enables significant heat to be driven into the exhaust system while maintaining combustion stability.

In some aspects, when the exhaust temperature is to be elevated, the engine is operated with a low modified air delivery ratio which yields increased internal residuals in the cylinder after port closure, which in turn increases the temperature of the air charge trapped (retained) in the cylinder. This higher trapped air charge temperature yields a higher exhaust temperature.

Preferably, a modified air delivery ratio represents a normalized mass flow rate into a cylinder. In this regard, a modified delivery ratio of 1 means that the amount of air delivered through the intake port is equal to the amount of mass that is inside the cylinder.

The elevated trapped temperature enables faster light-off of after-treatment catalysts during cold start, low load operation, and low ambient temperatures, catalyst temperatures high enough for light-off, and exhaust temperatures high enough to regenerate a diesel particulate filter under varying driving conditions, including idle and light loads.

In the low modified air delivery ratio operating mode, an intake manifold pressure is maintained at a level high enough to achieve an air-fuel ratio adequate for combustion stability.

DETAILED DESCRIPTION

The constructions described in this specification are presented in an explanatory context that includes an opposed-piston two-cycle engine having at least one cylinder in which a pair of pistons is disposed with their end surfaces in opposition. Each cylinder includes intake and exhaust ports formed or machined in a sidewall thereof. This explanatory context is intended to provide a basis for understanding various exhaust management strategies by way of illustrative examples.

Figure 1:
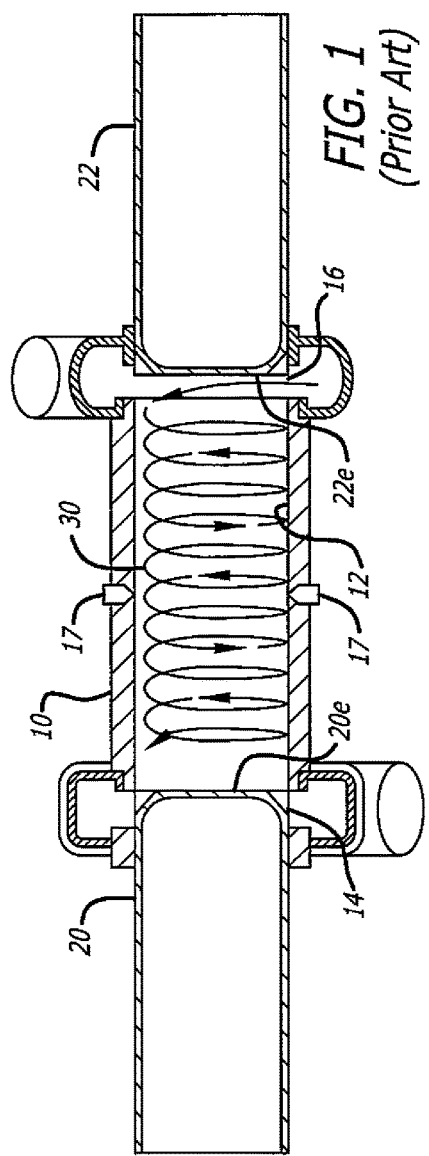
FIG. 1 is a side sectional partially schematic drawing of a cylinder of a prior art opposed-piston engine with opposed pistons near respective bottom dead center locations, and is appropriately labeled "Prior Art".
Figure 2:
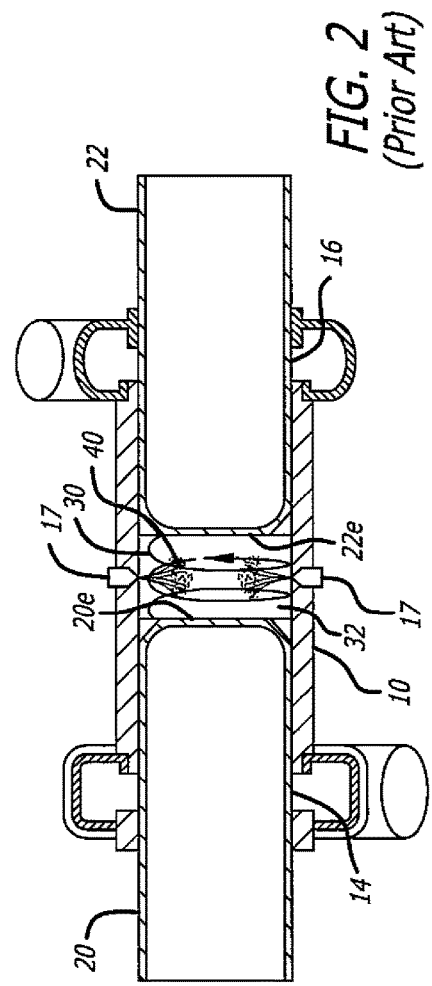
FIG. 2 is a side sectional partially schematic drawing of the cylinder of FIG. 1 with the opposed pistons near respective top dead center locations where end surfaces of the pistons define a combustion chamber, and is appropriately labeled "Prior Art".
Figure 3:
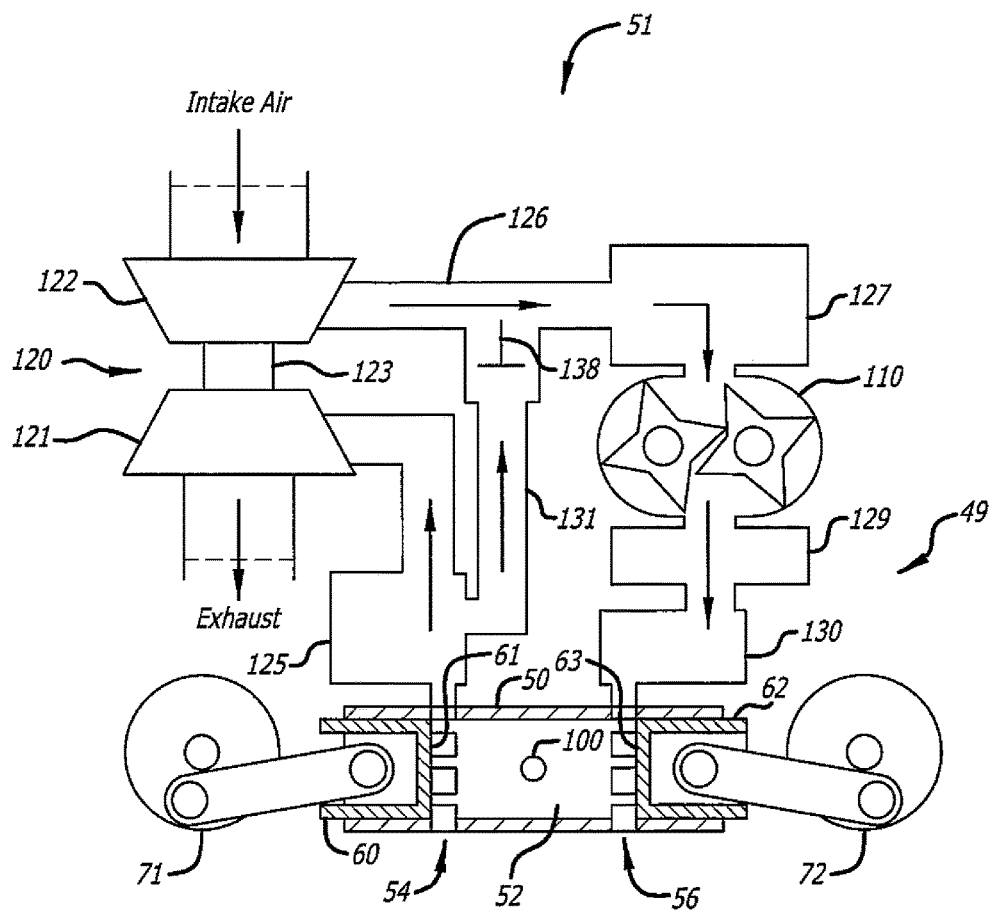
FIG. 3 is a conceptual schematic diagram of an opposed-piston two-cycle engine in which aspects of an air management system with EGR are illustrated.

In FIG. 3, an opposed-piston, two-cycle engine 49 (hereinafter referred to as "the opposed-piston engine") has at least one cylinder 50. For example, the opposed-piston engine may have one cylinder, two cylinders, three cylinders, or four or more cylinders. Each cylinder 50 has a bore 52 and exhaust and intake ports 54 and 56 formed or machined in respective ends thereof. The exhaust and intake ports 54 and 56 each include one or more circumferential arrays of openings in which adjacent openings are separated by a solid bridge. (In some descriptions, each opening is referred to as a "port"; however, the construction of a circumferential array of such "ports" is no different than the port constructions shown in FIG. 3.) Exhaust and intake pistons 60 and 62 are slidably disposed in each cylinder bore 52 with their end surfaces 61 and 63 opposing one another. The exhaust pistons 60 are coupled to a crankshaft 71, the intake pistons are coupled to the crankshaft 72.

When the pistons 60 and 62 of a cylinder 50 are at or near their TDC positions, a combustion chamber is defined in the bore 52 between the end surfaces 61 and 63 of the pistons. Fuel is injected directly into the combustion chamber through at least one fuel injector nozzle 100 positioned in an opening through the sidewall of a cylinder 50.

With further reference to FIG. 3, the engine 49 includes an air management system 51 that manages the transport of charge air provided to, and exhaust gas produced by, the engine 49. A representative air management system construction includes a charge air subsystem and an exhaust subsystem. In the air management system 51, the charge air subsystem includes a charge air source that receives intake air and processes it into charge air, a charge air channel coupled to the charge air source through which charge air is transported to the at least one intake port of the engine, and at least one air cooler in the charge air channel that is coupled to receive and cool the charge air (which may include exhaust gasses) before delivery to the intake port or ports of the engine. Such a cooler can comprise an air-to-liquid and/or an air-to-air device, or another cooling device. Hereinafter, such a cooler is denoted as a "charge air cooler". The charge air subsystem also includes a supercharger that pumps charge air in the charge air channel to intake ports of the engine. The exhaust subsystem includes an exhaust channel that transports exhaust products from exhaust ports of the engine to an exhaust pipe.

As per FIG. 3, the preferred charge air subsystem includes a supercharger 110, which can be driven by an electrical motor, or by a gear, chain, or belt apparatus coupled to a crankshaft. The supercharger 110 can be a single-speed or multiple-speed device, or a fully variable-speed device. In some aspects, the air management system 51 includes a turbo-charger 120 with a turbine 121 and a compressor 122 that rotate on a common shaft 123. The turbine 121 is coupled to the exhaust subsystem and the compressor 122 is coupled to the charge air subsystem. The turbine 121 can be a fixed-geometry or a variable-geometry device. The turbocharger 120 extracts energy from exhaust gas that exits the exhaust ports 54 and flows into the exhaust channel 124 directly from the exhaust ports 54, or from an exhaust manifold 125. In this regard, the turbine 121 is rotated by exhaust gas passing through it. This rotates the compressor 122, causing it to generate charge air by compressing intake air. The charge air output by the compressor 122 flows through a conduit 126 to a charge air cooler 127, whence it is pumped by the supercharger 110 to the intake ports. Air compressed by the supercharger 110 is output from the supercharger through a charge air cooler 129 to an intake manifold 130. The intake ports 56 receive charge air pumped by the supercharger 110, through the intake manifold 130. Preferably, but not necessarily, in multi-cylinder opposed-piston engines, the intake manifold 130 is constituted of an intake plenum that communicates with the intake ports 56 of all cylinders 50.

Exhaust Gas Management:

The air management construction enables control of NOx emissions by recirculating exhaust gas through the one or more ported cylinders of the opposed-piston engine. The recirculated exhaust gas is mixed with charge air to lower peak combustion temperatures, which lowers NOx emissions. This process is referred to as exhaust gas recirculation ("EGR"). An EGR construction can utilize exhaust gasses transported in an EGR channel external to the cylinder into the incoming stream of fresh intake air as per the valve-controlled recirculation channel 131 in FIG. 3. Alternatively, or additionally, an EGR process can utilize residual exhaust gasses that are trapped (retained) in the cylinders 50 when the exhaust and intake ports are closed and scavenging ceases. In the case of external EGR, the exhaust gas is pumped into the inflowing stream of air. A source of pressure in communication with the EGR channel creates a pressure differential that causes exhaust gas to flow through the EGR channel into the charge air subsystem. In some aspects, a virtual pump exists when the exhaust gas to be recirculated is obtained from a source guaranteed to be at a higher pressure than the point where it is fed into the intake stream of charge air. In other aspects, an active pump, such as the supercharger 110, is used to pump the exhaust gas to be recirculated into the charge air that the supercharger is pumping to the intake ports. In these aspects, use of a supercharger provides an additional variable for controlling EGR operations in an opposed-piston engine. In some aspects recirculated exhaust gas is cooled by way of one or more EGR coolers, which can comprise air-to-liquid and/or air-to-air devices. In other aspects, recirculated exhaust gas is cooled by one or more charge air coolers alone or in combination with one or more EGR coolers.

EGR Loop Construction:

The opposed-piston engine 49 seen in FIG. 3 is equipped with an EGR loop that channels exhaust gas from the exhaust subsystem into the charge air subsystem. An example of a specific EGR loop construction (which is not intended to be limiting) is a high pressure configuration illustrated in FIG. 4. In this regard, a high pressure EGR loop circulates exhaust gas obtained from a source upstream of the turbine 121 to a mixing point downstream of the compressor 122. In this EGR loop the conduit 131 and an EGR valve 138 shunt a portion of the exhaust gas from the exhaust manifold 125 to be mixed with charge air output by the compressor 122 into the conduit 126. If no exhaust/air mixing is required the valve 138 is fully shut and charge air with no exhaust gas is delivered to the cylinders. As the valve 138 is increasingly opened, an increasing amount of exhaust gas is mixed into the charge air. This loop subjects the exhaust gas to the cooling effects of the two coolers 127 and 129. If less cooling is merited, the exhaust gas portion can be shunted around the cooler 127 to the input of the supercharger 110. This alternative subjects the exhaust gas portion to cooling by only the charge air cooler 129. A dedicated EGR cooler that cools only exhaust gas can be incorporated into the conduit 131, in series with the valve 138, or in series with the output port of the valve 138 and the input to the supercharger 110.

EGR Using Retained Exhaust Gas:

Another mode of mixing exhaust gas with charge air is provided in the uniflow-scavenged opposed-piston engine 49 by trapping (or retaining) a residual amount of exhaust gas in a cylinder after the exhaust and intake ports close and scavenging ceases. The residual exhaust gas can be used to adjust the initial conditions for combustion to a point advantageous for reducing NOx emissions. Depending on the configuration of the turbo-machinery, at low and medium engine speeds and loads, a uniflow-scavenged opposed-piston engine may exhibit incomplete scavenging. Since the residual exhaust gas inside the cylinder is hot, the resulting temperature of the new charge of air may be substantially elevated; therefore this method is well-suited for reducing NOx under partial engine load conditions. Further, when combustion occurs, the heightened air charge temperature results in an increased exhaust gas temperature, which is useful for light-up of after-treatment catalysts and regeneration of diesel particulate filter materials.

The amount of charge air that is fed into a cylinder each cycle can be used to alter the amount of residual exhaust gas left in the cylinder. In this regard, adjusting the amount of charge air that is fed into the cylinder in any given cycle of operation can be used to "tune" the amount of exhaust gas retained in the cylinder for the next combustion occurrence. In one aspect of retained exhaust gas EGR, seen in FIG. 4, a recirculation loop 148 including a valve 139 is placed in parallel with the supercharger 110. The valve 139 is operated to control the amount of charge air pumped into a cylinder by the supercharger 110. Setting the amount of charge air pumped allows control of the amount of exhaust gas scavenged, and, consequently, the amount of exhaust gas retained in any cylinder following scavenging. In this regard, if a high intake manifold pressure is desired the valve 139 is fully shut and charge air is delivered to the engine at a high rate. As the valve 139 is increasingly opened, an increasing amount of charge air pumped by the supercharger 110 is returned (recirculated) to the inlet of the supercharger, which proportionately reduces the amount of charge air delivered to the engine. Thus, the charge air/fuel ratio is reduced and the amount of exhaust gas retained in any cylinder is increased. Among the benefits realized by this aspect of retained exhaust gas EGR are NOx reduction, reduction of the pumping load imposed on the engine by the supercharger 110, and an increased temperature due to the combustion gasses trapped in the cylinder.

Figure 4:
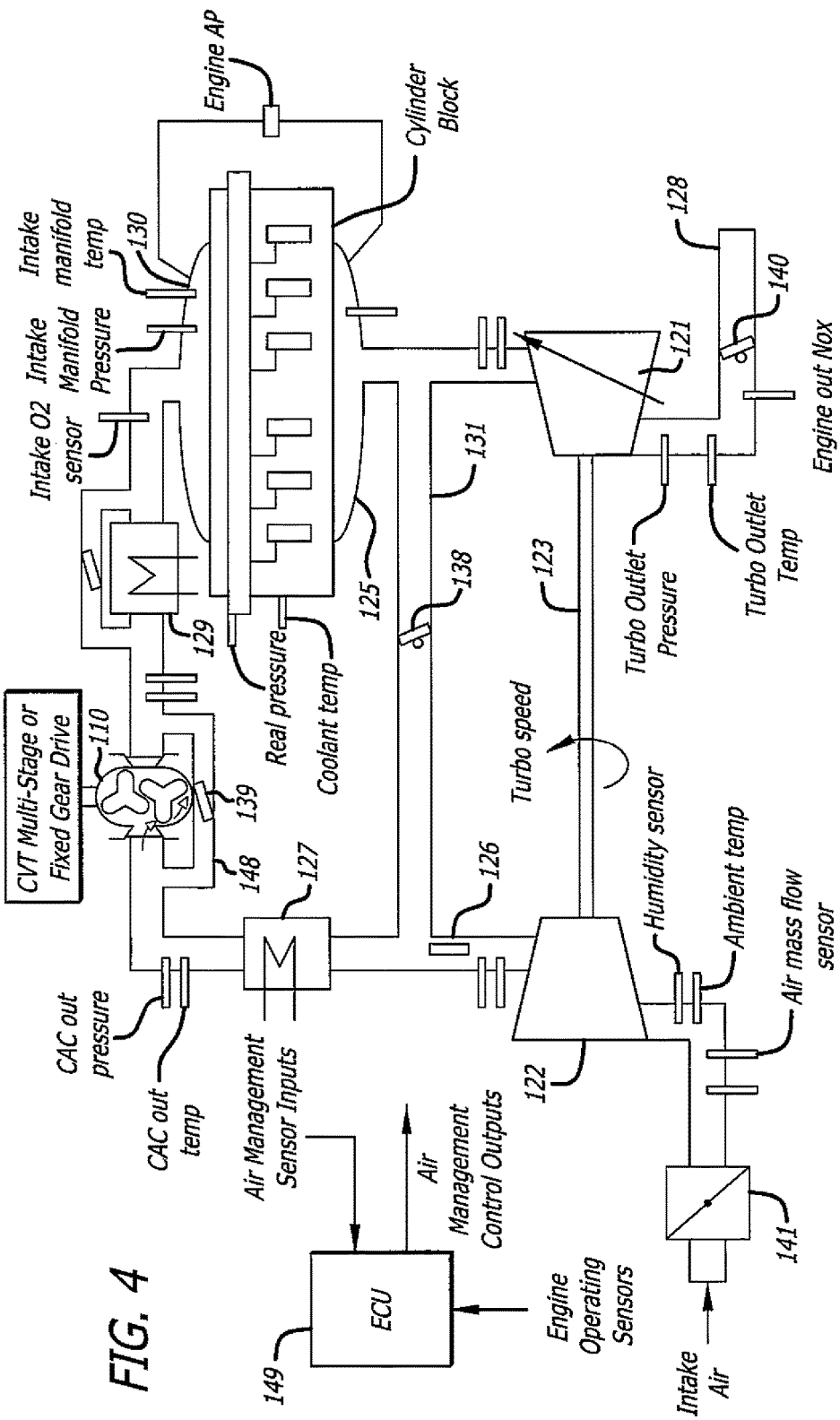
FIG. 4 is a conceptual schematic drawing illustrating a preferred construction for EGR in an opposed-piston two-cycle engine.

An increase in the pressure felt by exhaust gas flowing to the turbine 121 ("backpressure") can also be used to alter the amount of residual exhaust gas left in the cylinder. In this regard, adjusting the amount of backpressure in any given cycle of operation can be used to "tune" the amount of residual exhaust gas for the next combustion occurrence. Therefore, in another aspect of retained exhaust gas EGR, seen in FIG. 4, a variable valve 140 is placed in series with exhaust gas output from the exhaust manifold 125. The setting of the valve 140 directly influences the backpressure felt upstream of the valve and, consequently, the amount of exhaust gas retained in any cylinder after scavenging. In FIG. 4, the valve 140 is placed in series with the output of the turbine 121, upstream of the tailpipe 128. In this case, any backpressure resulting from the setting of the valve is distributed over all cylinders of the engine. In an alternative aspect, an equivalent valve (not seen) can be placed in series between the input to the turbine 121 and the exhaust manifold 125. In yet another alternative aspect, the equivalent valve can be placed in series with an exhaust manifold or exhaust port of each of a plurality of cylinders.

Turbine Bypass Construction:

As seen in FIG. 4 of related U.S. patent application Ser. No. 13/068,679, filed May 16, 2011 and published as US 2011/0289916 A1 on Dec. 1, 2011, a bypass conduit loop 143 including a valve 144 can be placed in parallel with the turbine 121. The valve 144 can be operated to control the amount of exhaust gas flowing from the engine into the turbine 121. Setting the valve 144 to bypass the turbine 121 allows exhaust energy to be dumped into the exhaust pipe 128 without operating the turbine 121 and compressor 122. This keeps the exhaust gas at a higher temperature level and can increase after-treatment conversion efficiencies (for catalytic devices and particulate filters) at engine warm-up during partial engine load conditions such as from a cold start. Further, setting the valve 144 to bypass the turbine 121 during engine operation under partial engine load conditions reduces turbo-charger operation, and allows more exhaust gas to be driven over the supercharger 110 (via valve 138, for example) while also delivering exhaust gas at a higher temperature to increase after-treatment conversion efficiencies. Another construction for varying the amount of exhaust gas flowing from the engine into the turbine 121 includes a turbine with a variable geometry construction to control pressure in the exhaust conduit 124, upstream of the valve 144. Using a variable geometry turbine (VGT) instead of a fixed geometry turbine does not necessarily eliminate the need for a turbine bypass valve such as the valve 144. A VGT has only a limited mass flow range where it works at acceptable efficiencies. Outside this range, a turbine bypass valve can be used to control the mass flow and intake pressure of the engine 49.

Optionally, an intake throttle valve 141 and a turbine bypass valve can be included in the air management system for high precision control of the ratio of recirculated exhaust gas to fresh air.

Figure 5:
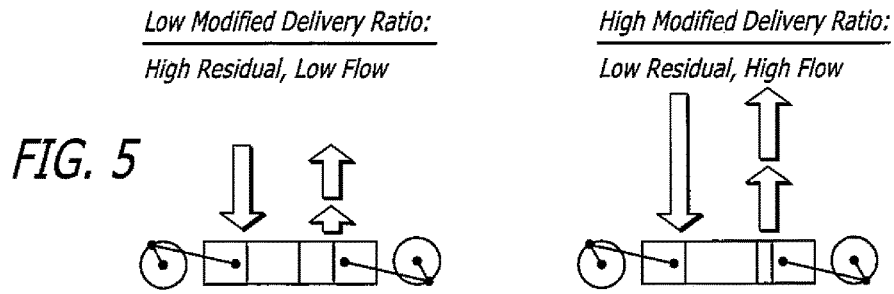
FIG. 5 is a graphical representation of varying a modified air delivery ratio.

Exhaust Configuration and Control:

The EGR constructions illustrated in FIG. 4 are combined in the air management system of the opposed piston engine described and illustrated herein so as to trap (retain) uncooled exhaust gas in a cylinder following port closure where it is combined or mixed with charge air including recirculated exhaust gas that is cooled and provided to the cylinder prior to port closing. The relative amounts of retained and recirculated exhaust gas are varied in order to precisely control the EGR rate and temperature. This enables operation of the air management system of the opposed piston engine in such a way as to allow significant heat to be expelled into the exhaust subsystem. In this regard, a modified air delivery ratio $\Lambda^* = m_{del}/\rho_{del}V_{tr}$ is the ratio of the mass of the delivered air $m_{del}$ (fresh air and external EGR delivered to a cylinder) divided by the mass of the trapped charge $\rho_{del}V_{tr}$ (density of the delivered charge multiplied by the trapped volume at port closing). FIG. 5 represents the amount of cooled fresh charge (in blue) in a combustion chamber compared to the amount of hot residual charge (in red). As the modified air delivery ratio is increased, the percentage of fresh charge trapped in the cylinder is increased and the quantity of residual charge from the previous cycle decreases.

As per FIG. 5, running the engine at low modified air delivery ratios yields significant internal residuals, which in turn increases the trapped temperature of the charge. In this operating mode, a sufficiently high intake manifold pressure is required to achieve an adequate air-fuel ratio and good combustion stability during light load operation, low ambient temperature operation and extreme cold starts. In addition, temperatures can be further enhanced when low modified delivery ratios and high intake manifold pressure are coupled with a late-injection strategy. This creates a significant temperature rise in the exhaust for catalyst light-off and management, yielding good conversion efficiency for after-treatment performance. This approach also supports in-use rate diagnostic requirements for the after-treatment as well as the temperature required to regenerate the diesel particulate filter under all driving conditions, including idle and light loads.

For this strategy to be effective, it is desirable to control the modified air delivery ratio and, therefore, the composition of the trapped charge. The modified air delivery ratio is primarily a function of the scavenging characteristics of the engine, the intake manifold conditions and the exhaust backpressure. The intake manifold conditions, in turn, depend on the speed of the supercharger 110, the settings of the recirculation valve 139, and the rate of cooled external EGR delivered into the charge air stream as determined by the settings of the EGR valve 138. The backpressure conditions are controlled by the settings of the backpressure valve 140; additionally or alternatively, backpressure can be controlled by a variable nozzle turbo mechanism, by multi-stage turbo-charging, or by turbo-compounding.

During low load operations as well as low ambient temperatures, the temperature of the trapped charge in the cylinder can be significantly increased by running a low modified delivery ratio. This will result in an increased exhaust temperature as well as improved combustion stability. Maintaining a low delivery ratio will also decrease the pumping work which will help BSFC/fuel economy.

During extreme cold start conditions low modified delivery ratios can be used on the first few cycles of the engine cranking, which would keep much, if not most, of the same charge in the cylinder. This would heat up the charge as well as the combustion chamber before even introducing any fuel to burn. This would greatly improve the starting and robustness to early misfires.

During DPF regeneration at idle or low loads leveraging a low delivery ratio yielding higher exhaust temperatures would enable a diesel oxidation catalyst to be above the required light-up temperature to convert hydrocarbons. The hydrocarbons would generate an exothermic reaction to yield the high temperatures required to burn the soot loaded in the DPF.

For example, the following ranges have been used for the identified conditions:

| Condition | Range |
| --- | --- |
| Cold start | $0.4 \leq \Lambda^* \leq 0.5$ |
| Low load operation | $0.48 \leq \Lambda^* \leq 0.6$ |
| Normal, High load operation | $0.5 \leq \Lambda^* \leq 0.85$ |
| Full load, low speed operation | $0.7 \leq \Lambda^* \leq 1.0$ |

As per FIG. 4, a process to operate an opposed-piston two-stroke engine with an exhaust subsystem that includes EGR loop and retained exhaust constructions, under control of a modified delivery ratio, is executed by an ECU 149. The ECU maintains and changes the modified delivery ratio in response to specified engine operating conditions by automatically operating the valves 138, 139, and 140, the supercharger 110, if a multi-speed or variable speed device is used, and the turbo-charger 120, if a variable-geometry device is used. Of course, operation of valves, throttles, and associated elements used for EGR can include any one or more of electrical, pneumatic, mechanical, and hydraulic actuating operations. For fast, precise automatic operation, it is preferred that the valves be high-speed, computer-controlled devices with continuously-variable settings. Each valve has a first state in which it is open (to some setting controlled by the ECU 149) to allow gas to flow through it, and a second state in which it is closed to block gas from flowing through it.

Preferably an integrated exhaust control process including a modified delivery ratio routine automatically operates a multifunction EGR system incorporating EGR loop and retained exhaust constructions described and illustrated herein based upon one or more parameters relating to recirculated exhaust gas and to a mixture of recirculated exhaust gas and charge air. Parameter values are determined by a combination of one or more of sensors, calculations, and table lookup so as to manage the values of individual parameters and one or more ratios of EGR and mixture parameters in one or more cylinders.

Exhaust Management:

Referring now to FIG. 4, the combination of the turbo-charger compressor 122 and the supercharger 110 needs to provide enough air to produce stable combustion at a low air/fuel ratio. At the same time, elevated backpressure must be applied to the exhaust subsystem. The result of high intake manifold boost pressure and exhaust backpressure will yield adequate air/fuel ratio levels with low engine delta pressure (pressure difference) and significant residual gases trapped in the cylinder for combustion.

These results can be achieved by a control mechanization implemented by ECU programming. Operation of the control mechanization enables the execution of an exhaust management strategy by controlling trapped air/fuel ratio ("trapped $\lambda$"), trapped burn fraction ("trapped BF"), and trapped temperature.

The ECU 149 reads all the available engine sensors. Based on the sensor values the current engine torque demand (load) and RPM are determined. This information is fed into a desired-trapped-cylinder-condition module. In this module the desired trapped $\lambda$ at port closing and trapped BF at port closing are determined based on look up tables (maps) that are indexed by engine torque and RPM to meet the desired performance, emissions and temperature goals. These maps are pre-filled based on engine dynamometer testing and stored in the ECU 149.

Figure 6A:
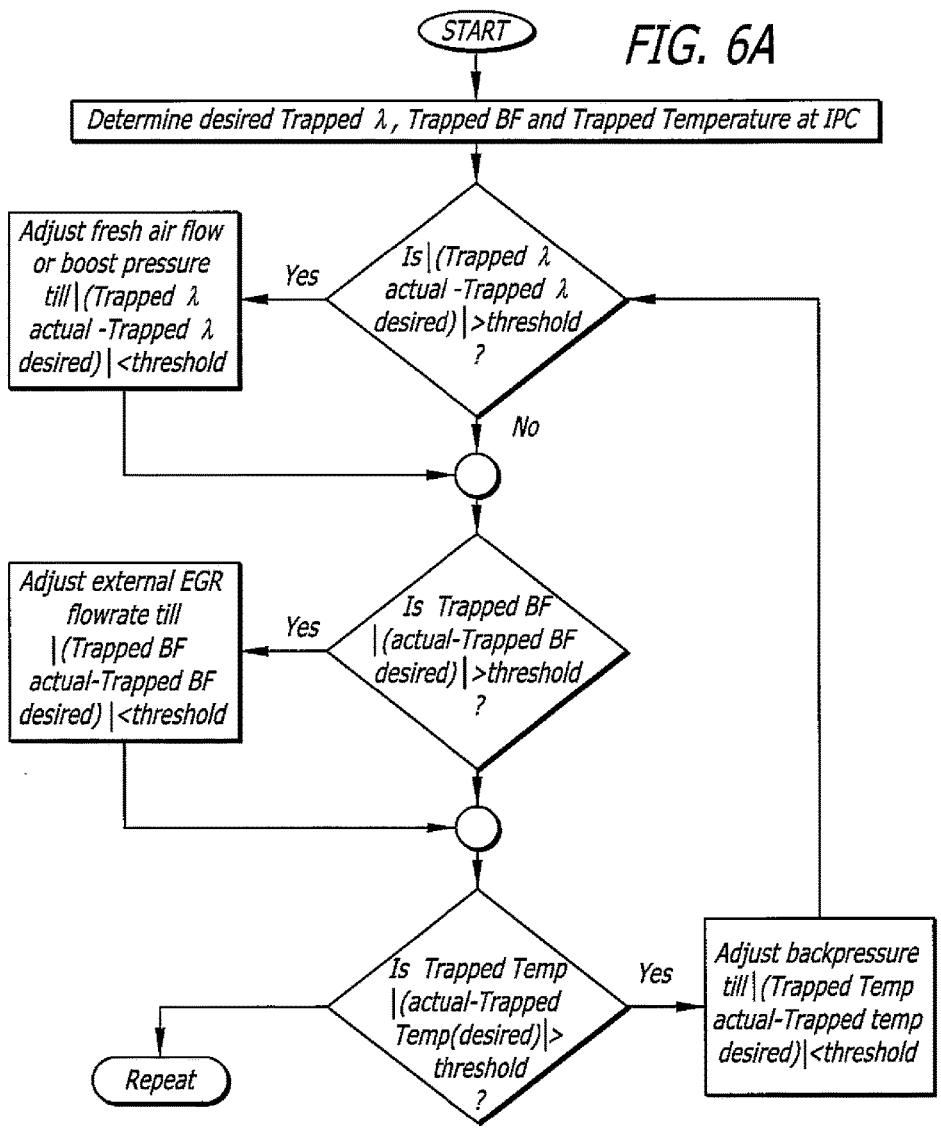
FIG. 6A is a flow diagram representing a control loop for managing trapped air charge temperature based upon control variable values.

An estimate is made of actual trapped $\lambda$, actual trapped BF and actual trapped temperature. Based on the routine shown in FIG. 6A, the actual and desired trapped conditions are compared. If the absolute value of each difference is greater than a threshold, the routine adjusts accordingly to get this difference within an acceptable limit. The adjustment in fresh air flow or intake manifold pressure is carried out by controlling a supercharger actuator output. For example, if the supercharger is driven by continuously variable drive then the routine varies the drive ratio. If the supercharger is driven by fixed drive ratio then the routine varies the setting of the recirculation valve 139. Control of the trapped BF is enabled by varying EGR flow rate using the EGR valve 138 to minimize the error between the actual trapped BF and desired BF. Once the trapped $\lambda$ and trapped BF errors have been minimized, the routine then compares actual trapped temperature to a predefined value. This predefined value of trapped temperature is determined based on engine dynamometer testing and stored in the ECU. If the actual trapped temperature turns out to be significantly different than this predefined temperature then the strategy adjusts the back pressure (for example, by the backpressure valve 140) and loops back to recalculate the desired trapped λ and desired trapped BF. The routine then readjusts the supercharger output and EGR valve position. This is repeated continuously as the engine transitions from one operating point (engine load and speed) to another operating point (engine load and speed).

Figure 6B:
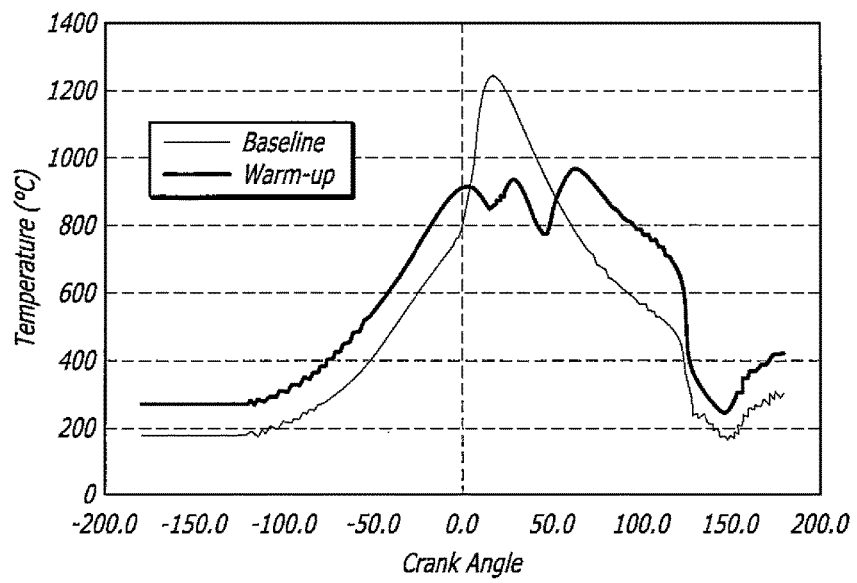
FIG. 6B is a graphical representation showing temperature profiles of a trapped air charge while in a cylinder during a normal operating condition and during a warm-up operating condition.
Figure 6C:
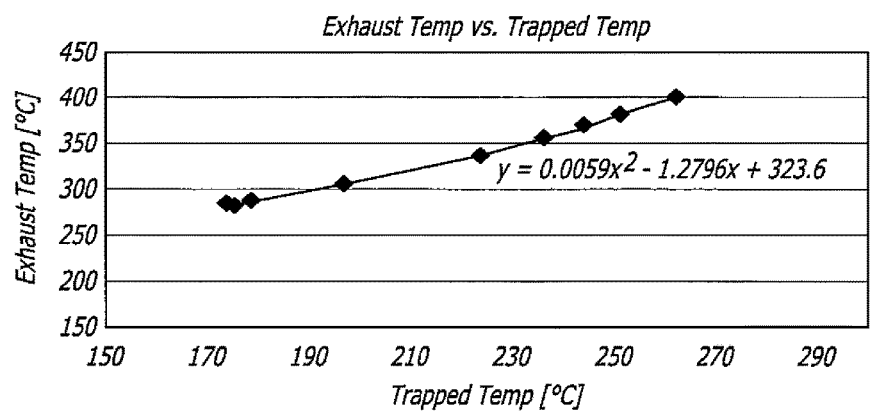
FIG. 6C is a graphical representation of a relationship between trapped temperature and exhaust temperature measured for a single cylinder test engine.

The differences between a normal operating condition and this warm-up operating condition are illustrated in FIG. 6B which shows the temperature profile of the charge while in the cylinder. As per FIG. 6B, the warm-up mode strategy provides lower peak temperatures while increasing the starting and ending temperatures. A relationship between the trapped temperature and the exhaust temperature measured for a single cylinder test engine is shown in FIG. 6C.

Figure 7A:
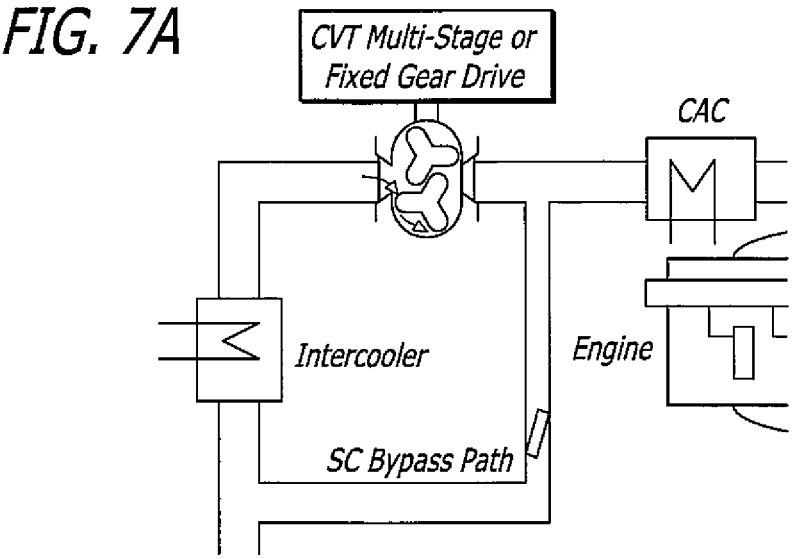
FIGS. 7A, 7B, 7C, and 7D are conceptual schematic drawings illustrating alternate constructions for cooling charge air in a supercharger recirculation loop.
Figure 7B:
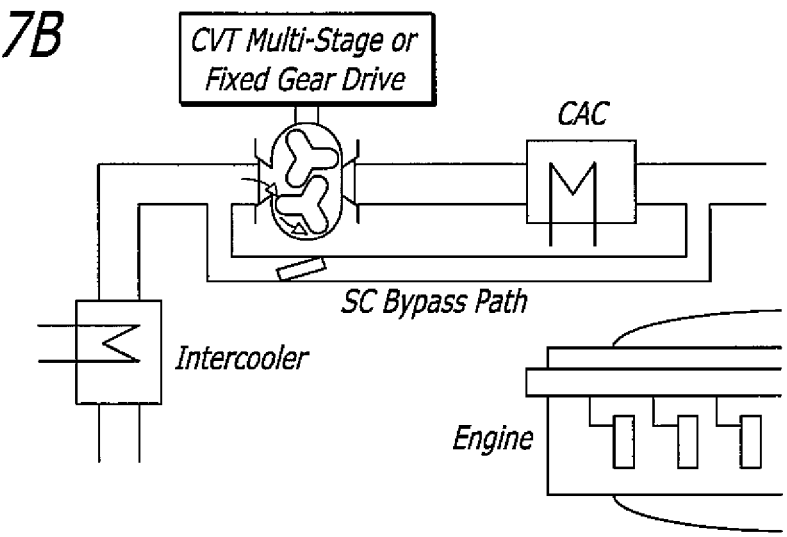
Figure 7C:
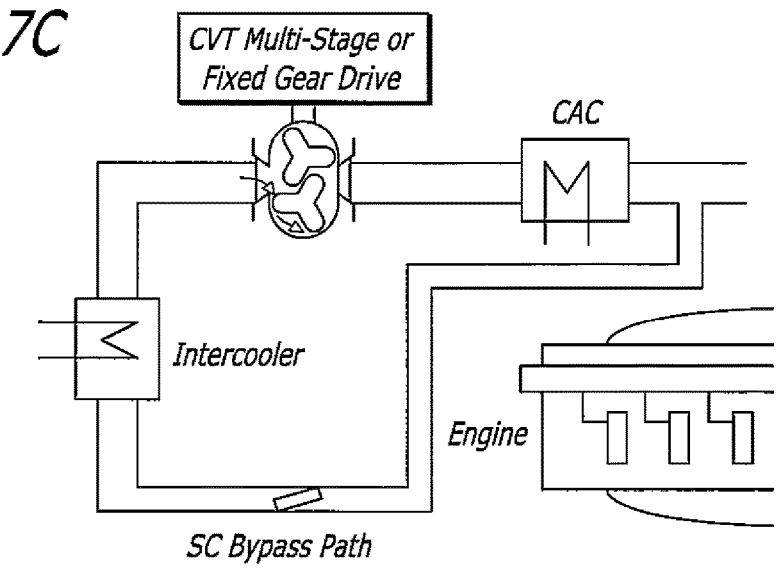
Figure 7D:
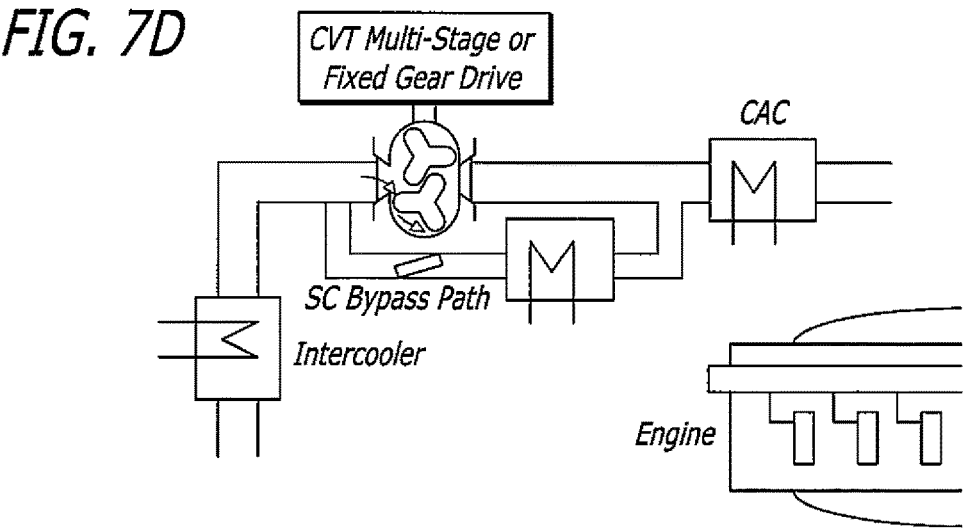

Alternate Supercharger Recirculation Embodiments:

A supercharger 110 is used to create a positive pressure differential across the opposed-piston engine 49 in order to drive the charge air flow and EGR flow. When operating the supercharger 110 with the recirculation valve 139 as required to limit the pressure ratio between the intake and exhaust manifolds, the temperature of the recirculation flow from the outlet of the supercharger is increased compared to the fresh air charge flow into the inlet of the supercharger. The higher temperature gas then mixes with the inlet charge air flow and increases the temperature of the airflow into the supercharger. In some aspects, this bypass flow is cooled in order to keep the supercharger from experiencing temperatures above its hardware limitations under certain desired conditions. In this regard, the recirculation loop 148 has a construction with an inlet connected to the charge air channel downstream of the supercharger 110, an outlet connected to the charge air channel upstream of the supercharger 110, and a variable valve 139 between the inlet and the outlet. An air cooler between the inlet and the outlet, in series with the valve 139 cools the charge air recirculated from the outlet to the inlet of the supercharger 110. For example, in FIG. 7A, the output of the recirculation loop 148 is fed into the charge air stream upstream of the cooler 127. In FIG. 7B, the input to the valve 139 is fed from the charge air stream downstream of the cooler 129. In FIG. 7C, the input to the valve 139 is fed from the charge air stream downstream of the cooler 129 and the output of the recirculation loop 148 is fed into the charge air stream upstream of the cooler 127. In FIG. 7D, a cooler 150 specific to the valve 139 is placed in the recirculation loop 148 either upstream or downstream of the valve 139.

EGR and after-Treatment Combinations:

The EGR construction of FIG. 4 includes a high pressure EGR loop. Alternatively, a low pressure EGR loop can be used to the same effect. In this regard, a low pressure EGR loop circulates exhaust gas obtained from a source downstream of the turbine 121 to a mixing point upstream of the compressor 122. In addition various arrangements of after-treatment components can be combined with high- and low-pressure EGR loop constructions for an opposed-piston two-stroke engine operated in the manner described above. The after-treatment components include a diesel oxidation catalyst device (DOC), a selective catalytic reduction device (SCR), and a diesel particulate filter device (DFR).

Figure 8:
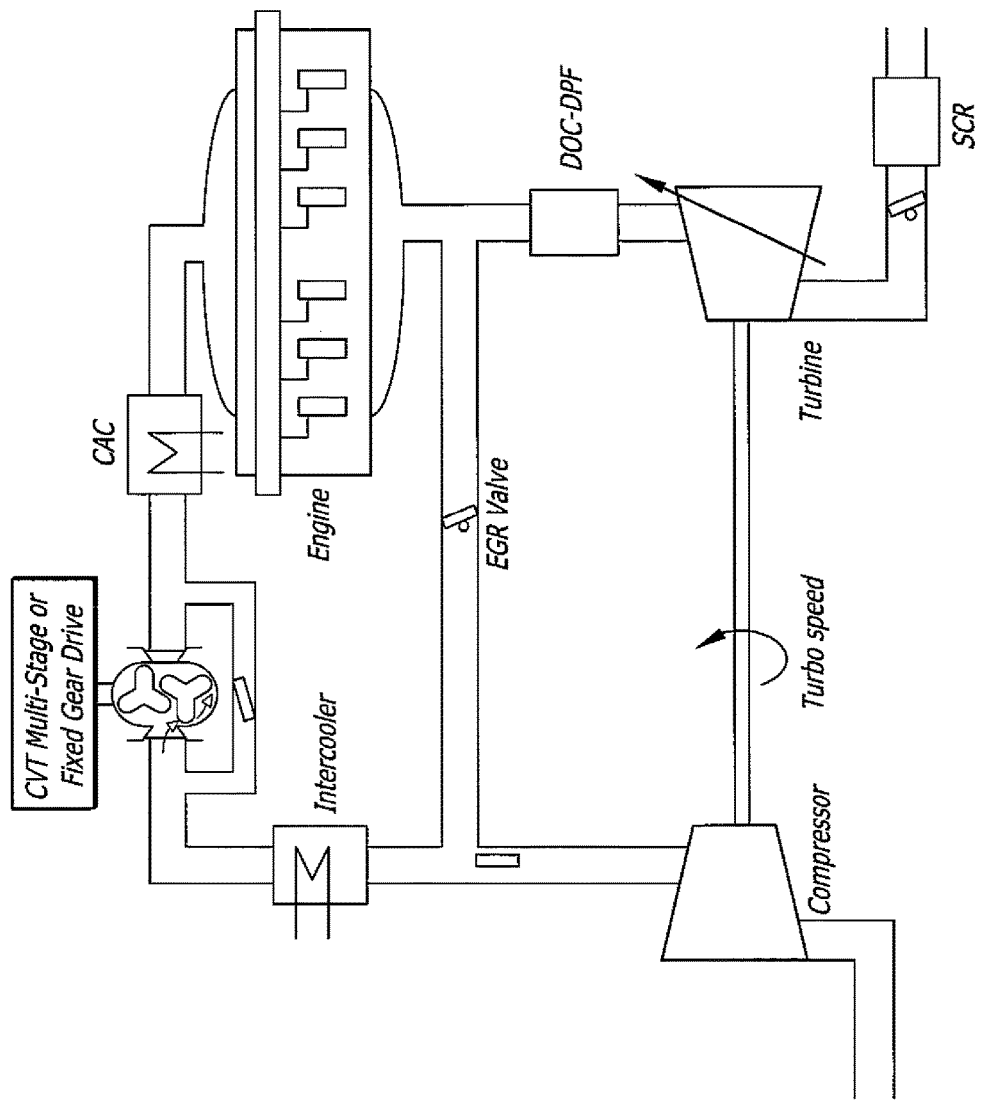
FIG. 8 is a conceptual schematic drawing illustrating an opposed-piston two cycle engine with a high-pressure EGR loop construction in combination with a first arrangement of after-treatment components.

FIG. 8 depicts an exhaust subsystem construction including a high-pressure EGR loop and a DOC and DPF located in the exhaust stream prior to the turbine. This construction allows for higher exhaust temperature going through the DOC and DPF, which can improve the soot regeneration in the DPF and improves the light-off time of the DOC. The higher pressure before the turbine also increases the density of the exhaust flow and minimizes the backpressure caused by the after-treatment, in this case DOC and DPF.

Figure 9:
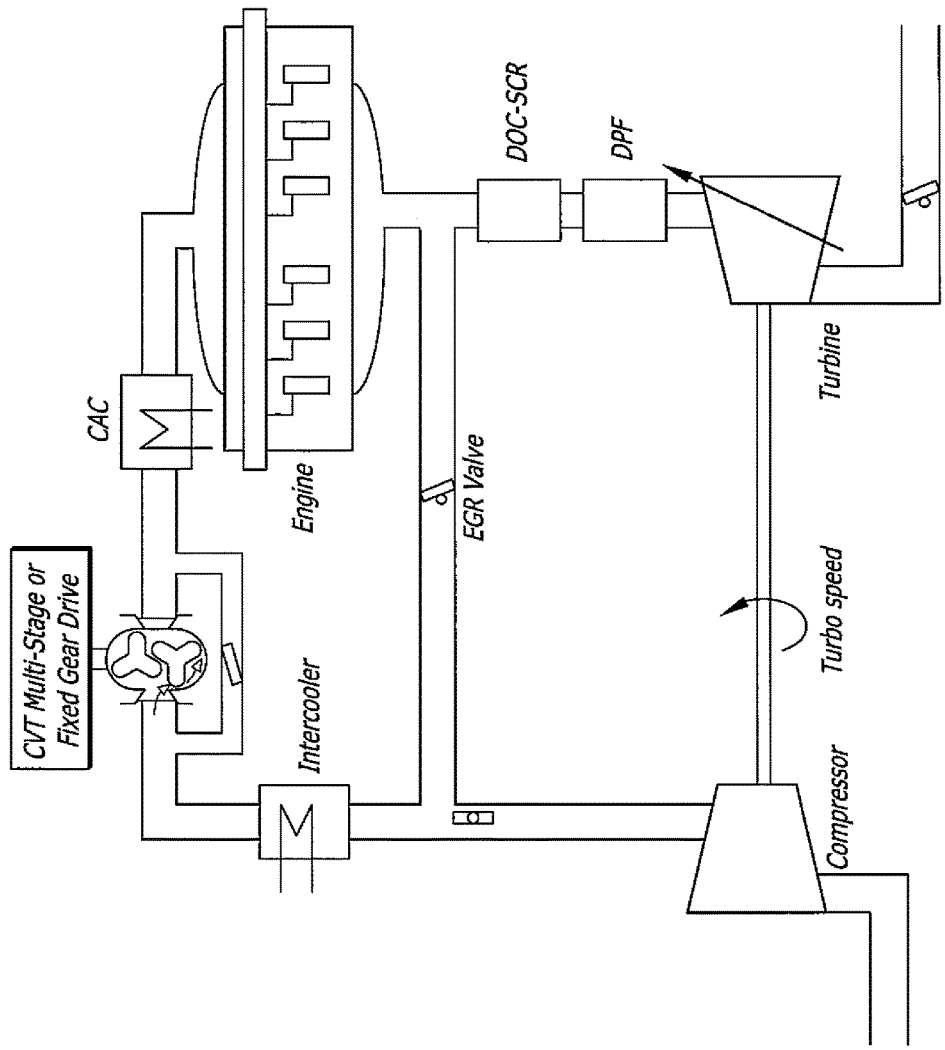
FIG. 9 is a conceptual schematic drawing illustrating an opposed-piston two cycle engine with a high-pressure EGR loop construction in combination with a second arrangement of after-treatment components.

FIG. 9 depicts an exhaust subsystem construction including a high-pressure EGR loop and a DOC, an SCR and a DPF located upstream of the turbine.

Figure 10:
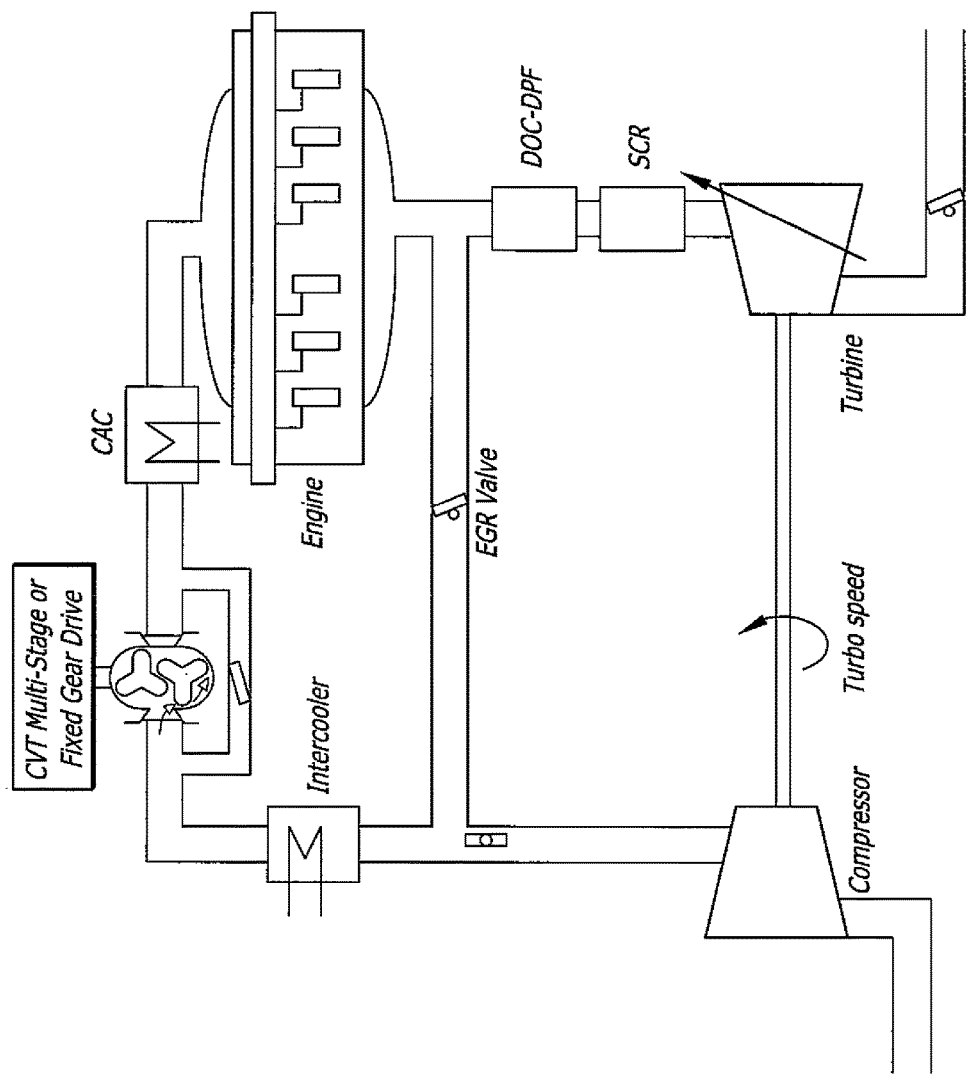
FIG. 10 is a conceptual schematic drawing illustrating an opposed-piston two cycle engine with a high-pressure EGR loop construction in combination with a third arrangement of after-treatment components.

FIG. 10 is similar to FIG. 9 except the SCR is positioned after the DOC and DPF.

Figure 11:
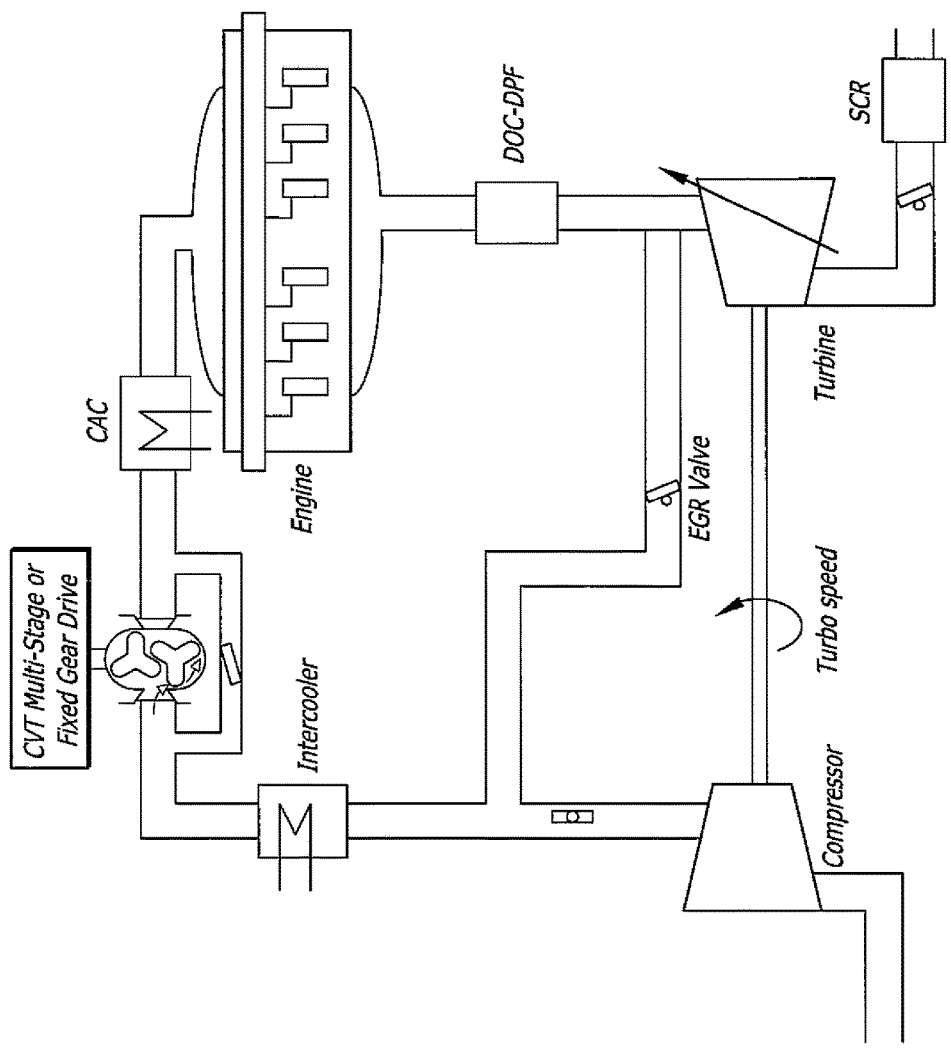
FIG. 11 is a conceptual schematic drawing illustrating an opposed-piston two cycle engine with a high-pressure EGR loop construction in combination with a fourth arrangement of after-treatment components.

FIG. 11 depicts an exhaust subsystem construction including a high-pressure EGR loop and a DOC and DPF located upstream of the EGR pick-up location. This is a different system than the one from FIG. 8 because in this case all the exhaust flow goes through the DOC DPF, and the EGR, which is taken downstream, is clean of soot, hydrocarbons and CO, which are removed by the DOC and DPF. This may provide a favorable condition for the air charge subsystem which would not be contaminated by soot and unburned hydrocarbon.

Figure 12:
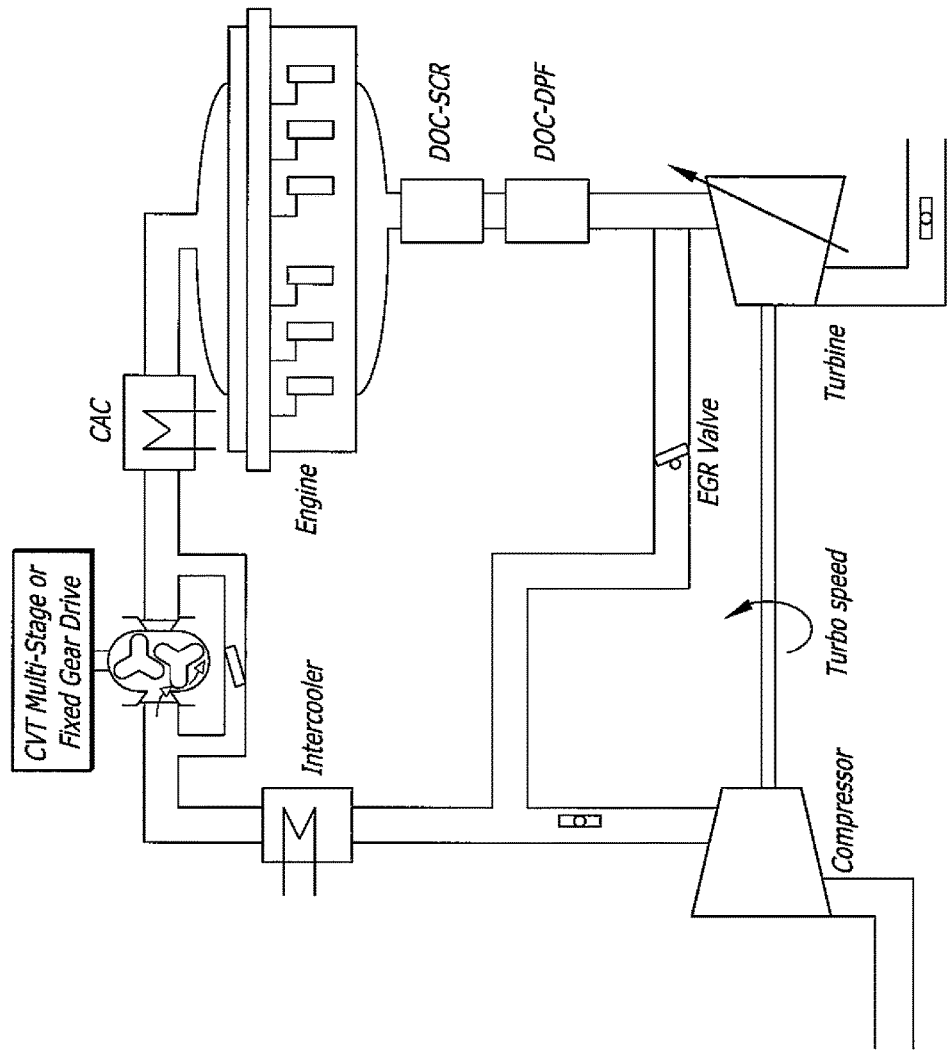
FIG. 12 is a conceptual schematic drawing illustrating an opposed-piston two cycle engine with a high-pressure EGR loop construction in combination with a fifth arrangement of after-treatment components.
Figure 13:
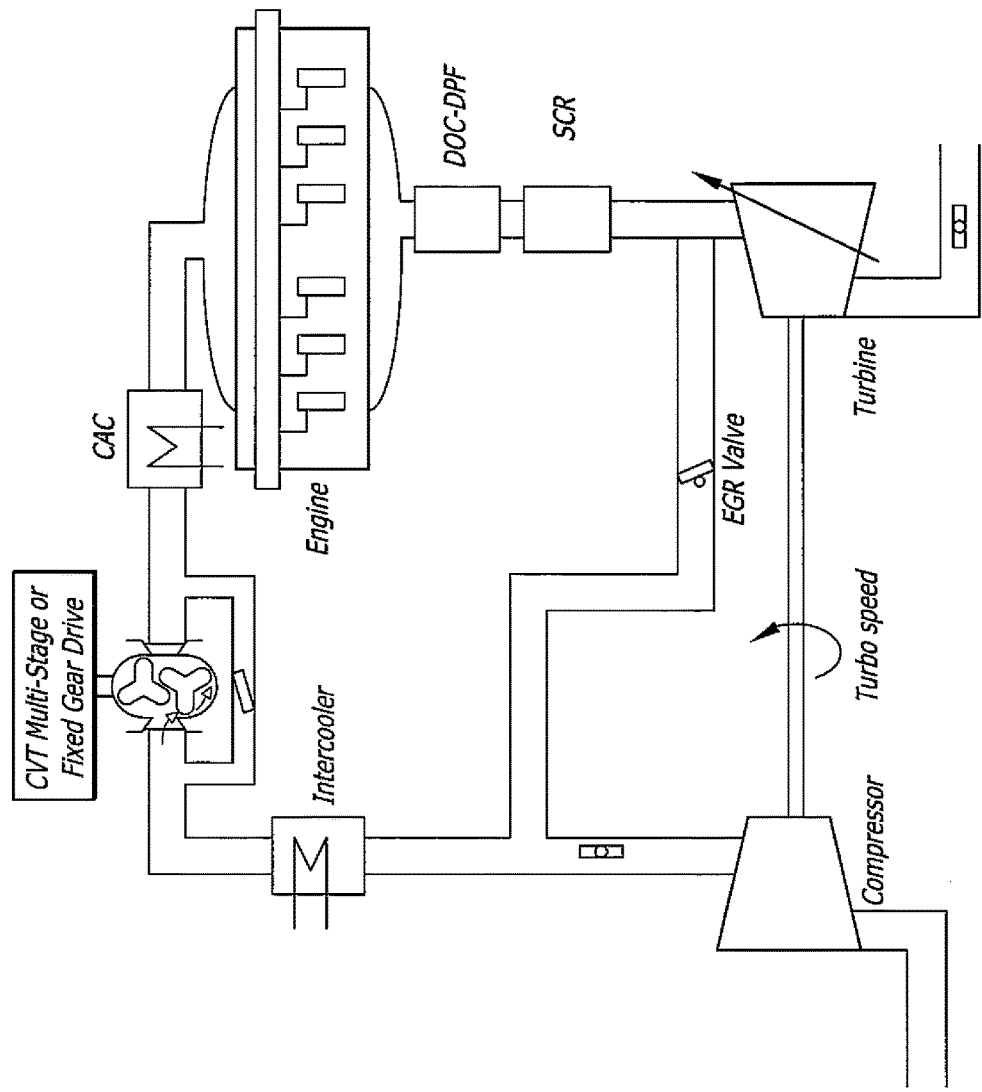
FIG. 13 is a conceptual schematic drawing illustrating an opposed-piston two cycle engine with a high-pressure EGR loop construction in combination with a sixth arrangement of after-treatment components.

FIGS. 12 and 13 depict an exhaust subsystem construction similar to the one from FIG. 11 but where both sets of after-treatment devices are located in various orders before the EGR pick-up point. Note that in the case of FIG. 12 where the SCR is located before the DPF that an additional DOC is needed before the SCR to control hydrocarbon and carbon monoxide.

Figure 14:
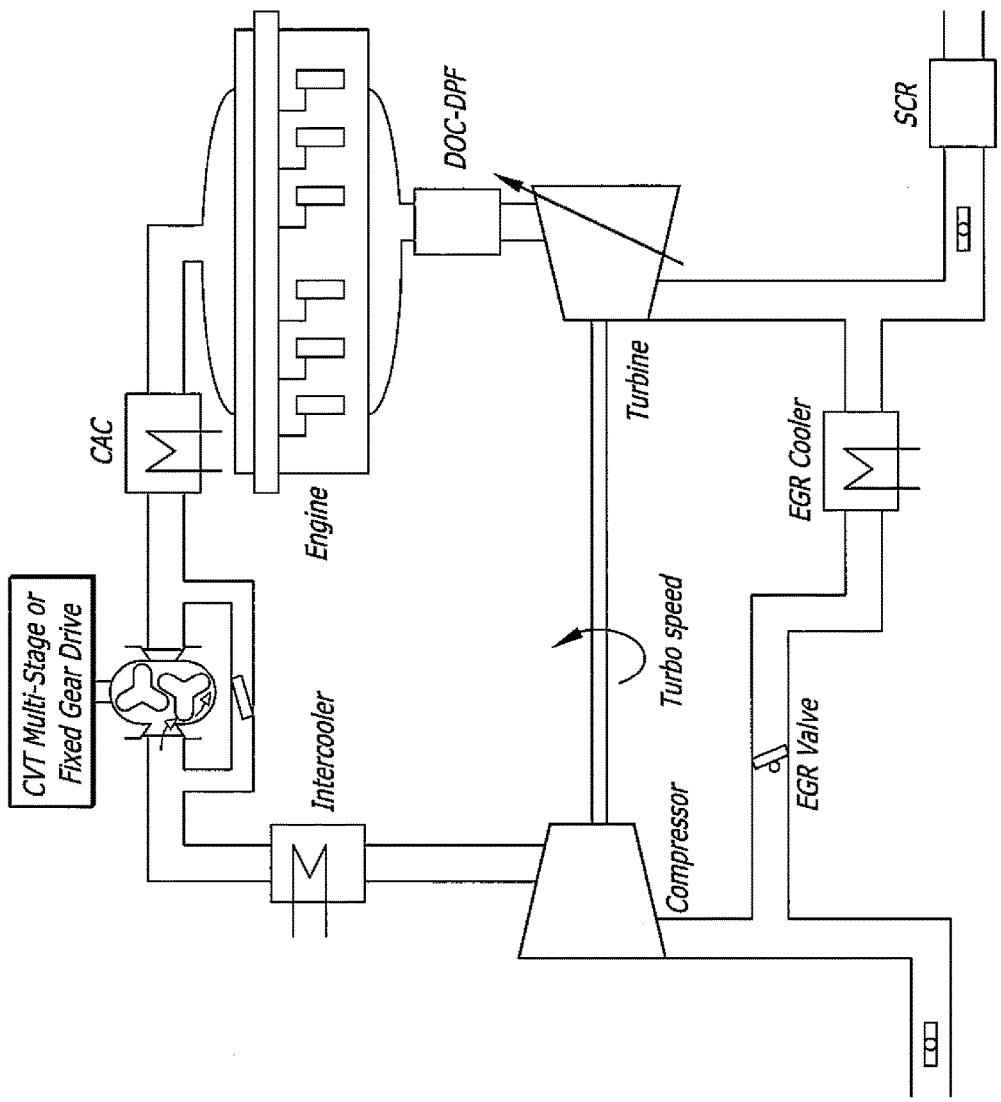
FIG. 14 is a conceptual schematic drawing illustrating an opposed-piston two cycle engine with a low-pressure EGR loop construction in combination with a seventh arrangement of after-treatment components.

FIG. 14 depicts an exhaust subsystem construction including a low-pressure EGR loop with a dedicated EGR cooler. This permits different choices of turbocharger and supercharger sizes that may be more favorable for some applications. Note the addition of a backpressure valve upstream of the compressor inlet that is used to increase the driving pressure for the EGR.

Figure 15:
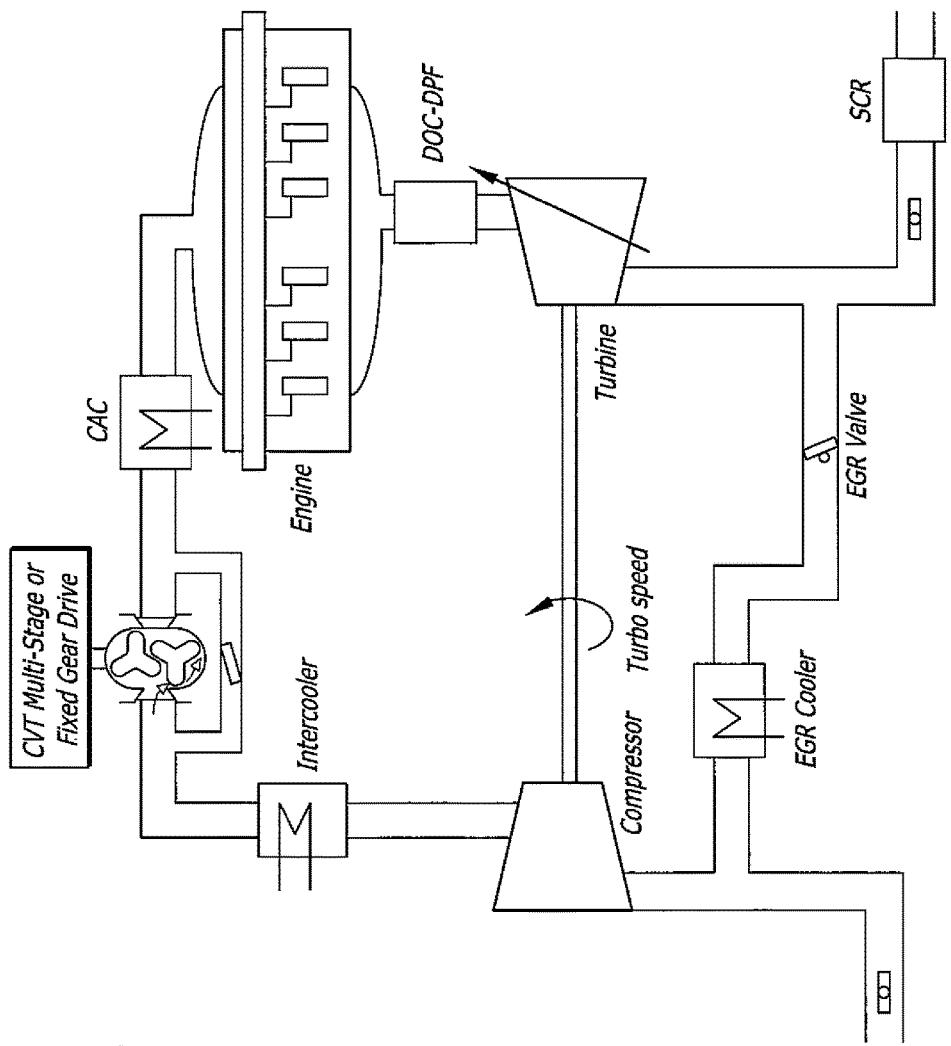
FIG. 15 is a conceptual schematic drawing illustrating an opposed-piston two cycle engine with a low-pressure EGR loop construction in combination with an eighth arrangement of after-treatment components.

FIG. 15 depicts an exhaust subsystem construction similar to the one in FIG. 14 but with the EGR valve installed downstream of the EGR cooler.

Figure 16:
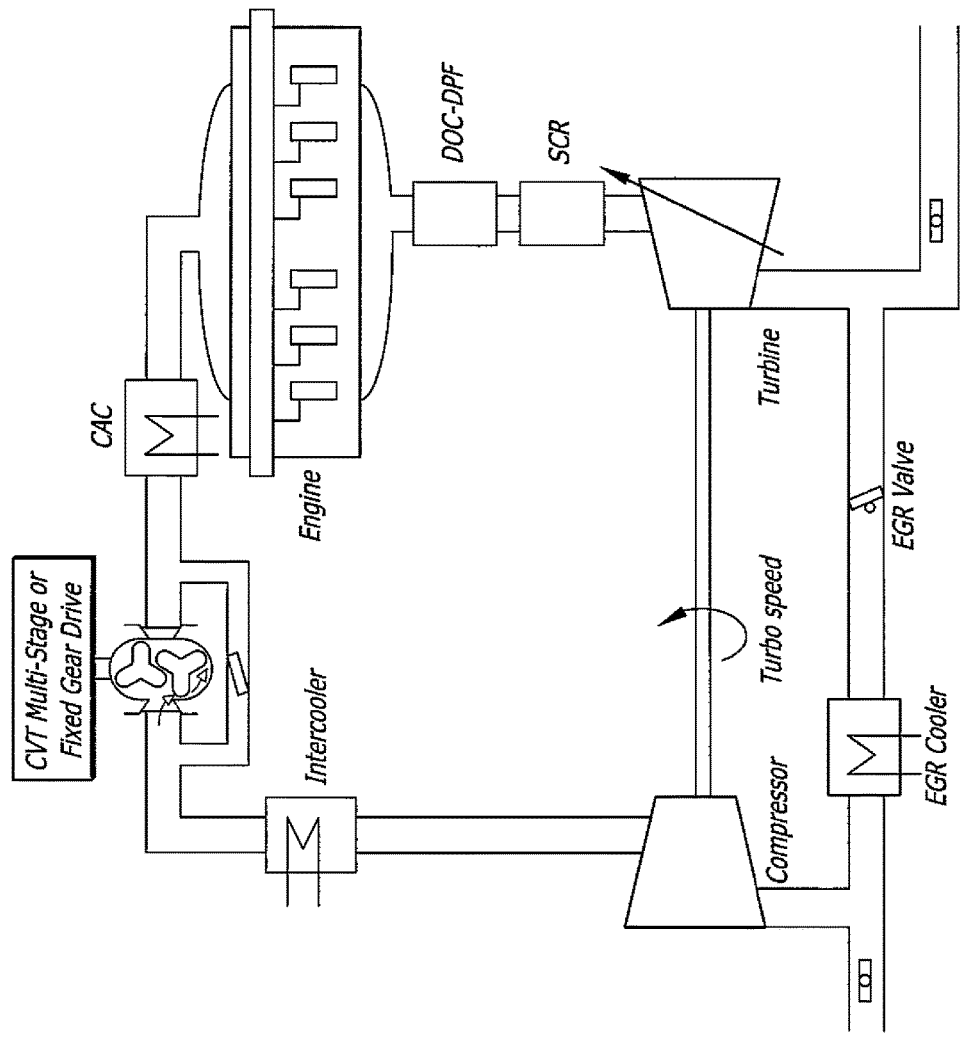
FIG. 16 is a conceptual schematic drawing illustrating an opposed-piston two cycle engine with a low-pressure EGR loop construction in combination with a ninth arrangement of after-treatment components.

FIG. 16 depicts an exhaust subsystem construction including a low-pressure EGR loop with a dedicated EGR cooler where both the DOC-DPF and SCR are located upstream of the turbine.

Figure 17:
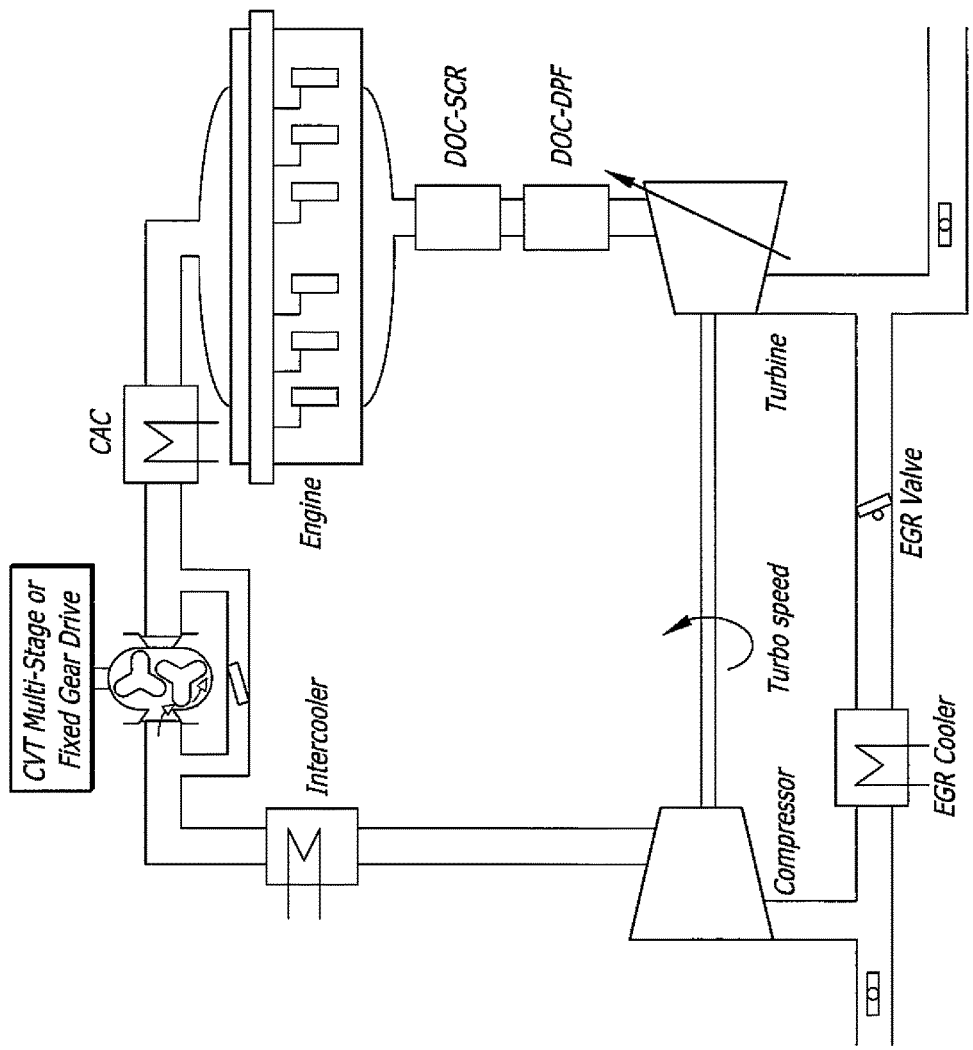
FIG. 17 is a conceptual schematic drawing illustrating an opposed-piston two cycle engine with a low-pressure EGR loop construction in combination with a tenth arrangement of after-treatment components.

FIG. 17 depicts an exhaust subsystem construction similar to FIG. 16 but with the SCR and DPF switched and a DOC added before the SCR.

Figure 18:
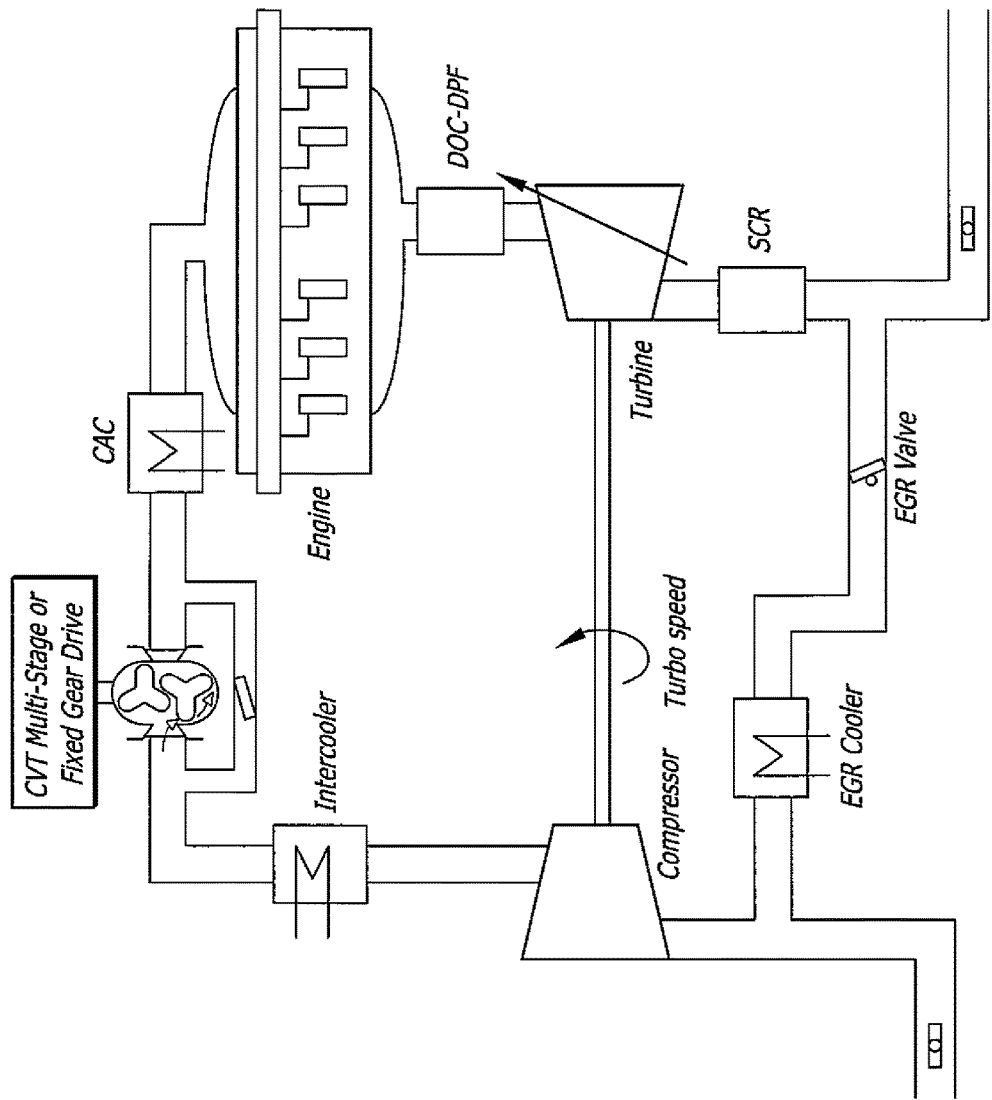
FIG. 18 is a conceptual schematic drawing illustrating an opposed-piston two cycle engine with a low-pressure EGR loop construction in combination with an eleventh arrangement of after-treatment components.

FIG. 18 depicts an exhaust subsystem construction including a low-pressure EGR loop with a dedicated EGR cooler and an input taken from after the SCR which is located post turbine.

Figure 19:
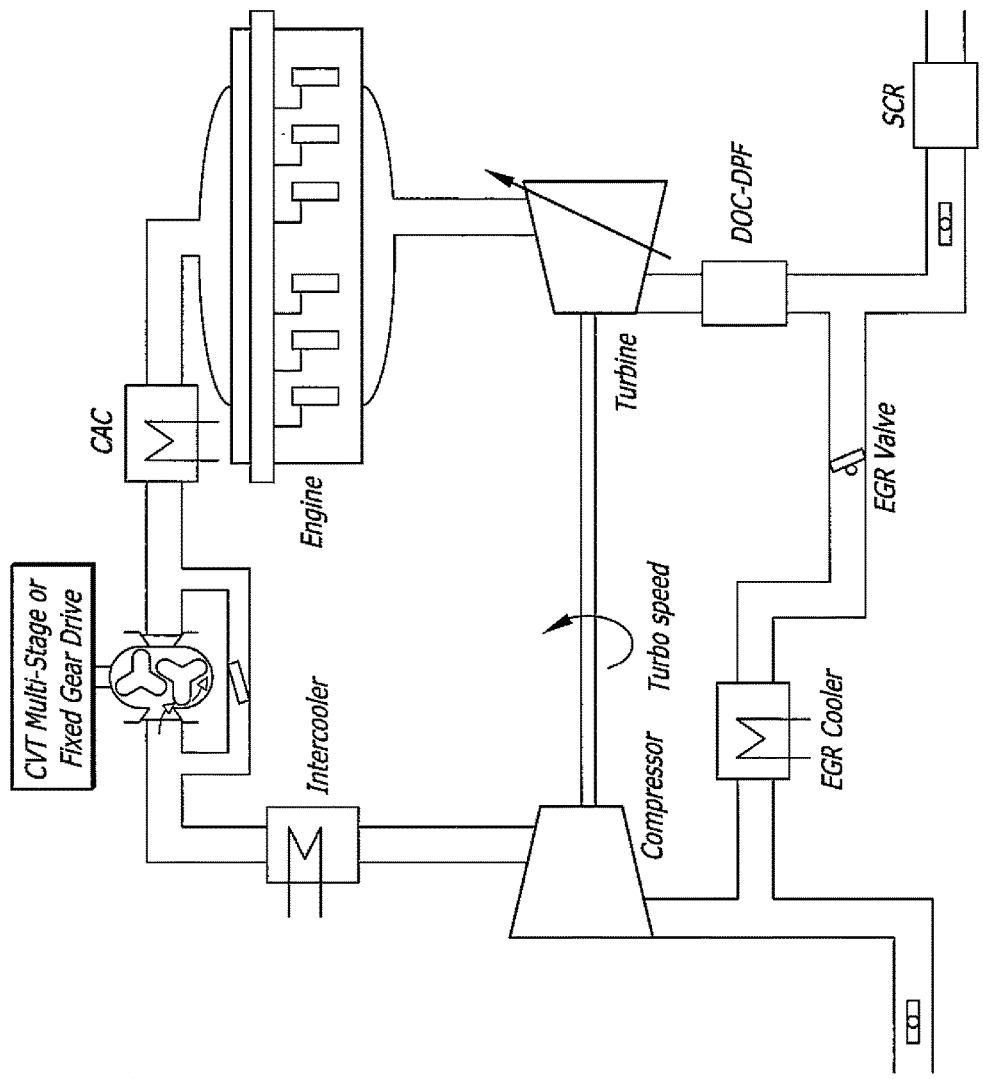
FIGS. 19, 20, and 21 are conceptual schematic drawings illustrating an opposed-piston two cycle engine with a low-pressure EGR loop construction in combination with twelfth, thirteenth, and fourteenth arrangements of after-treatment components.
Figure 20:
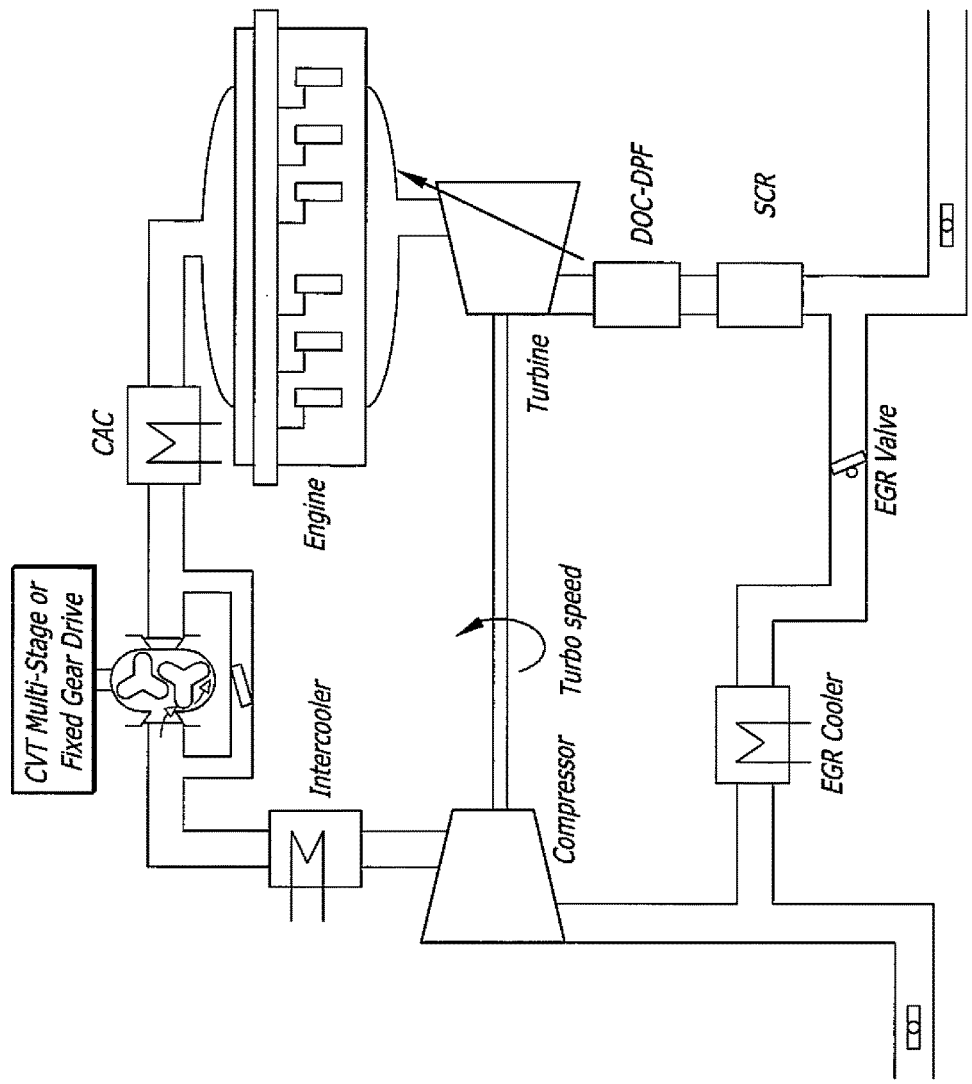
Figure 21:
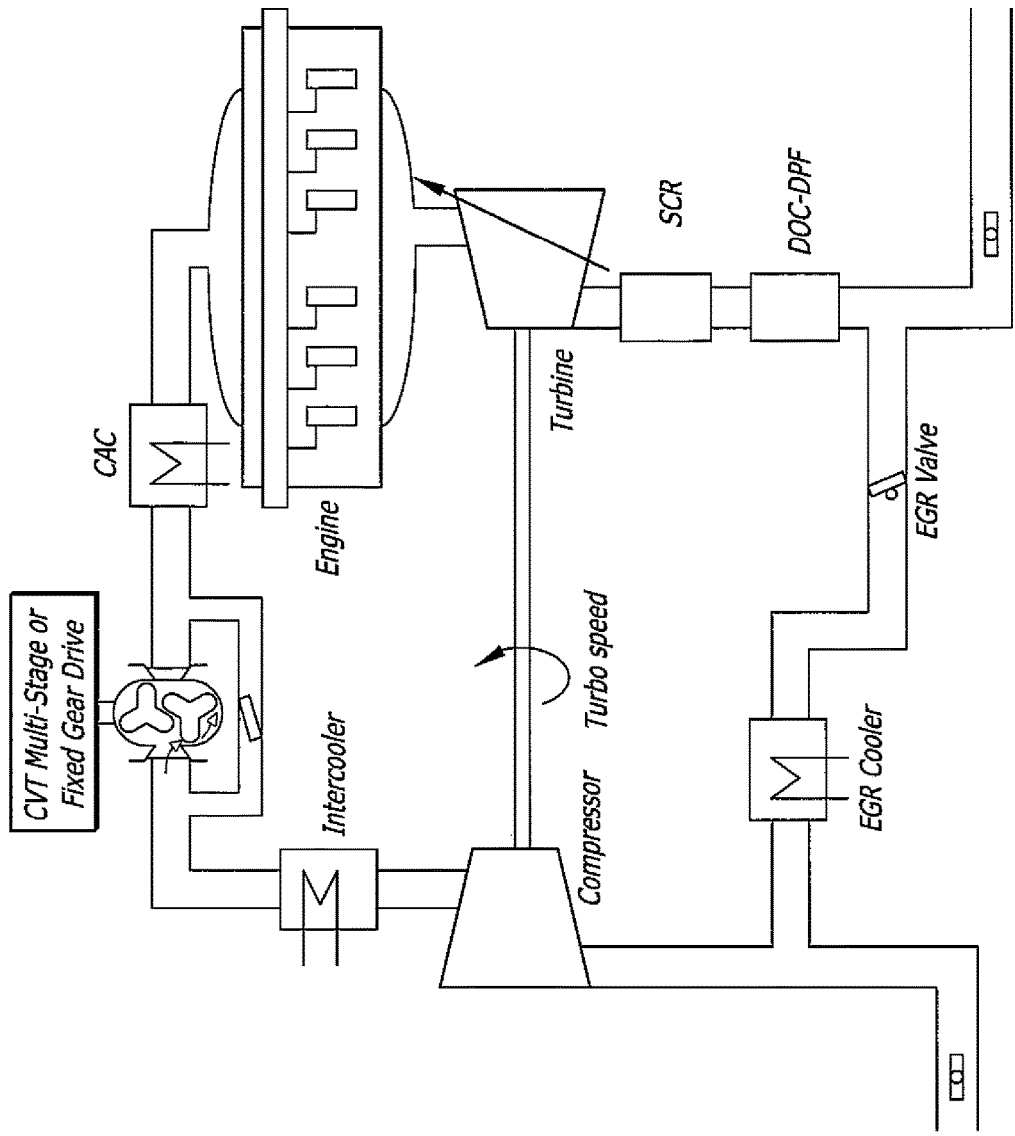

FIGS. 19, 20, and 21 depicts an exhaust subsystem construction including a low-pressure EGR loop with a dedicated EGR cooler where the after-treatment devices are located after the turbine. Each case shows a different combination of after-treatment placement and pick-up point for the EGR. Note that the EGR loop is always sampled downstream of the DPF. This is needed to protect the compressor wheel from soot.

Although exhaust management strategies have been described with reference to an opposed engine with two crankshafts, it should be understood that these constructions can be applied to opposed-piston engines with one or more crankshafts. Moreover, various aspects of these strategies can be applied to opposed-piston engines with ported cylinders disposed in opposition, and/or on either side of one or more crankshafts. Accordingly, the protection afforded to these constructions is limited only by the following claims.

We claim:

1. A method of operating a two-stroke cycle, opposed-piston engine, the engine including at least one cylinder with exhaust and intake ports, a charge air subsystem to provide charge air to an intake port of the engine, and an exhaust subsystem to receive exhaust from at least one exhaust port of the engine, in which an exhaust gas recirculation (EGR) loop has a loop input coupled to the exhaust subsystem and a loop output coupled to the charge air subsystem, a supercharger is operable to pump charge air in the charge air subsystem, a backpressure device is operable to control backpressure in the exhaust subsystem, and the exhaust subsystem includes an after-treatment catalyst device, the method comprising:

generating exhaust gas in the at least one ported cylinder of the engine;

transporting the exhaust gas from an exhaust port of the at least one ported cylinder through the exhaust channel;

recirculating a portion of the exhaust gas from the exhaust subsystem;

mixing recirculated exhaust gas with fresh air to form charge air;

pressurizing the charge air;

providing the charge air through an intake port of the at least one ported cylinder;

applying backpressure to the exhaust subsystem; and, trapping charge air and exhaust gas in the at least one ported cylinder in response to closure of the intake and exhaust ports such that an air delivery ratio ($\Lambda^*$) has a value in the range of $0.4 \leq \Lambda^* \leq 1.0$, where $\Lambda^* = m_{del}/\rho_{del}V_{tr}$, $m_{del}$ is the total mass of pressurized charge air (delivered charge) provided through the intake port, and $\rho_{del}V_{tr}$ is the density of the delivered charge multiplied by a trapped volume of the at least one ported cylinder at closure of the exhaust and intake ports;

wherein trapping the charge air and exhaust gas causes a temperature of the trapped charge air and exhaust gas to increase to a light-off level for after-treatment catalysts in the exhaust subsystem.

2. The method of claim 1, in which $0.4 \leq \Lambda^* \leq 1.5$ for a cold start of the engine.

3. The method of claim 1, in which $0.48 \leq \Lambda^* \leq 0.6$ for a low load condition of the engine.

4. The method of claim 3, wherein the after-treatment catalyst device includes a diesel oxidation catalyst device.

5. The method of claim 1, in which $0.5 \leq \Lambda^* \leq 0.85$ for a high load condition of the engine.

6. The method of claim 1, in which $0.7 \leq \Lambda^* \leq 1.0$ for a low speed condition of the engine.

7. The method of claim 1, wherein the after-treatment catalyst device includes a diesel oxidation catalyst device.

* * * * *

UNITED STATES PATENT AND TRADEMARK OFFICE
CERTIFICATE OF CORRECTION

PATENT NO. : 10,119,444 B2
APPLICATION NO. : 14/378252
DATED : November 6, 2018
INVENTOR(S) : Kalebjian et al.

Page 1 of 1

It is certified that error appears in the above-identified patent and that said Letters Patent is hereby corrected as shown below:

In the Claims

-- Column 14, Claim 2, Line 13, delete "$0.4 \leq \wedge^* \leq 1.5$" and replace with "$0.4 \leq \wedge^* \leq 0.5$"

Signed and Sealed this
Eleventh Day of December, 2018

Andrei Iancu
*Director of the United States Patent and Trademark Office*